United States Patent [19]

Balme et al.

[11] 4,373,154
[45] Feb. 8, 1983

[54] DATA ENCODING AND/OR DECODING

[75] Inventors: Michael J. Balme, Southampton; David T. Edwards, Lymington, both of England

[73] Assignee: Racal Recorders Ltd., Bracknell, England

[21] Appl. No.: 263,904

[22] Filed: May 15, 1981

[30] Foreign Application Priority Data

May 16, 1980 [GB] United Kingdom ............... 8016313
Dec. 4, 1980 [GB] United Kingdom ............... 8038980

[51] Int. Cl.³ ........................................... H03K 13/24
[52] U.S. Cl. ............................. 340/347 DD; 375/19; 360/44
[58] Field of Search ............... 340/347 DD; 360/38, 360/39, 40, 41, 42, 43, 44; 375/19; 371/55

[56] References Cited

U.S. PATENT DOCUMENTS

| 3,508,228 | 4/1970 | Bishop | 360/44 |
| 3,767,855 | 10/1973 | Ueno et al. | 375/23 |
| 3,792,454 | 2/1974 | Lipp | 360/44 |
| 3,995,264 | 11/1976 | Ouchi | 340/347 DD |
| 4,032,979 | 6/1977 | Rice | 340/347 DD |

FOREIGN PATENT DOCUMENTS

| 1152277 | 2/1960 | Fed. Rep. of Germany . |
| 1003210 | 11/1963 | United Kingdom . |
| 1087860 | 12/1964 | United Kingdom . |
| 1105448 | 5/1965 | United Kingdom . |
| 1098713 | 7/1966 | United Kingdom . |
| 1194551 | 1/1968 | United Kingdom . |
| 1382515 | 9/1972 | United Kingdom . |
| 1407163 | 1/1973 | United Kingdom . |
| 1518997 | 7/1975 | United Kingdom . |
| 1530828 | 11/1976 | United Kingdom . |
| 1540333 | 7/1977 | United Kingdom . |
| 2013943 | 1/1979 | United Kingdom . |

OTHER PUBLICATIONS

Judkovics, "IBM Technical Disclosure Bulletin", vol. 14, No. 8, Jan. 1972, pp. 2513-2514.

Primary Examiner—C. D. Miller
Attorney, Agent, or Firm—Leydig, Voit, Osann, Mayer & Holt, Ltd.

[57] ABSTRACT

In a data encoding system, digital data is encoded by adjusting the time position of each transition of a rectangular waveform with respect to the immediately preceding transition and in dependence on the value of the data units to be encoded. In one example disclosed, each data unit is a pair of bits of digital data which can therefore have any one of four binary values: 11, 10, 01 or 00. Immediately after a previous transition (T1), the system encodes the next pair of bits and makes the next transition at a time position (T2) dependent on the value of these bits. If the bits are 00, the next transition T2 is spaced from T1 by eight clock periods. If the bits are 01, T2 can occur either seven or nine clock periods after T1. If the bits are 10, T2 can occur either six or ten clock periods after T1. Finally, if the bits are 11, then T2 can occur either five or eleven clock periods after T1. In order to choose between the two time spacings available for the pairs of bits 01, 10 and 11, the system uses a decision map designed to keep the mean DC offset at zero and the mean time spacing constant.

27 Claims, 19 Drawing Figures

DATA ENCODING AND/OR DECODING

The invention relates to the encoding and decoding of electrical data signals. For example, the invention may be used in a case where the data is digital data and the recording medium is a magnetic recording medium such as magnetic tape.

According to the present invention, there is provided a system for encoding the values of units of data in which an electrical signal is produced in response to each data unit, each electrical signal being of opposite polarity to the preceding one and including means for adjusting the time spacing of each electrical signal from the preceding electrical signal in dependence on the value of the data unit, one of the possible values of the data unit corresponding to a predetermined datum time spacing and the or each other possible value of the data unit having a respective pair of possible time spacings, one greater than, and one less than, the length of the datum time spacing, and selecting means responsive to a data unit having the or each said other possible value to select a particular one of the two possible time spacings so as to minimise at least the mean long term DC content of the output waveform produced by the electrical signals.

According to the present invention, there is further provided a data encoding system for encoding a succession of items of data each of which can have any one of a predetermined plurality of different values, comprising data encoding means in which the successive items of data are considered in groups each consisting of the same predetermined plural number of data items and each group is encoded by determining the instantaneous time position of a respective single transition in an electrical signal with respect to the time position of the immediately preceding transition and in dependence on the values of the data items in that group, there being two possible time positions for at least one of the said groups, and in which one or other of these two time positions is selected in order that the encoded data meets one or more predetermined criteria.

According to the present invention, there is also provided a method for encoding the values of units of data including the steps of producing an electrical signal in response to each data unit, each electrical signal being of opposite polarity to the preceding one, adjusting the time spacing of each electrical signal from the preceding electrical signal in dependence on the value of the data unit, one of the possible values of the data unit corresponding to a predetermined datum time spacing and the or each other possible value of the data unit having a respective pair of possible time spacings, one greater than, and one less than, the length of the datum time spacing, and selecting, in response to a data unit having the or each said other possible value, a particular one of the two possible time spacings so as to minimise at least the mean long term DC constant of the output waveform produced by the electrical signals.

According to the present invention, there is yet further provided a method of encoding a succession of items of data each of which can have any one of a predetermined plurality of different values, comprising the steps of considering the successive items of data in groups each consisting of the same predetermined plural number of data items and encoding each group by determining the instantaneous time position of a respective single transition in an electrical signal with respect to the time position of the immediately preceding transition and in dependence on the values of the data items in that group, there being two possible time positions for at least one of the said groups, and in which one or other of these two time positions is selected in order that the encoded data meets one or more predetermined criteria.

Digital data encoding and decoding systems embodying the invention will now be described with reference to the accompanying diagrammatic drawings in which.

Figure 6:
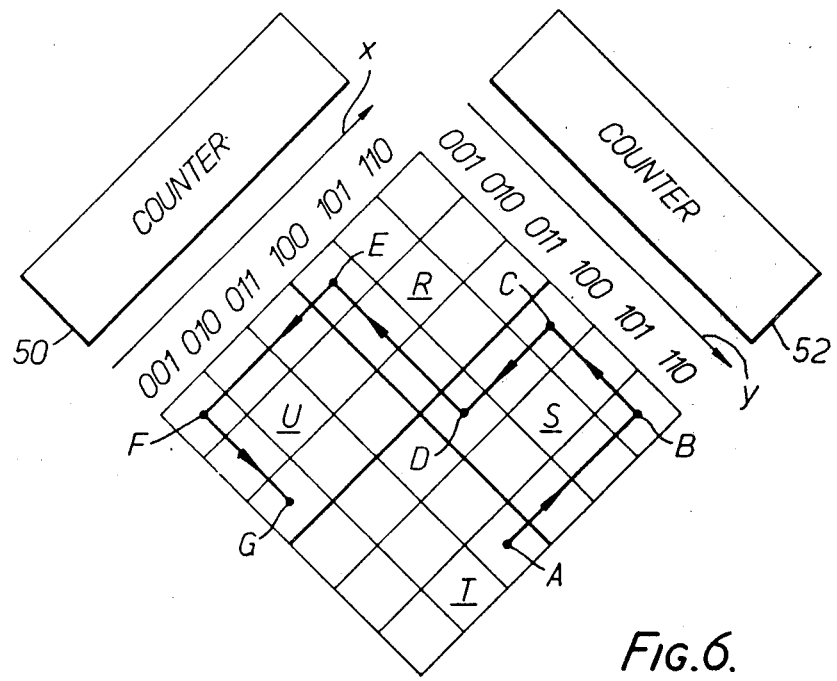
FIG. 6 is another diagram showing the map of FIG. 4 for explaining the operation of the encoding system.
Figure 9:
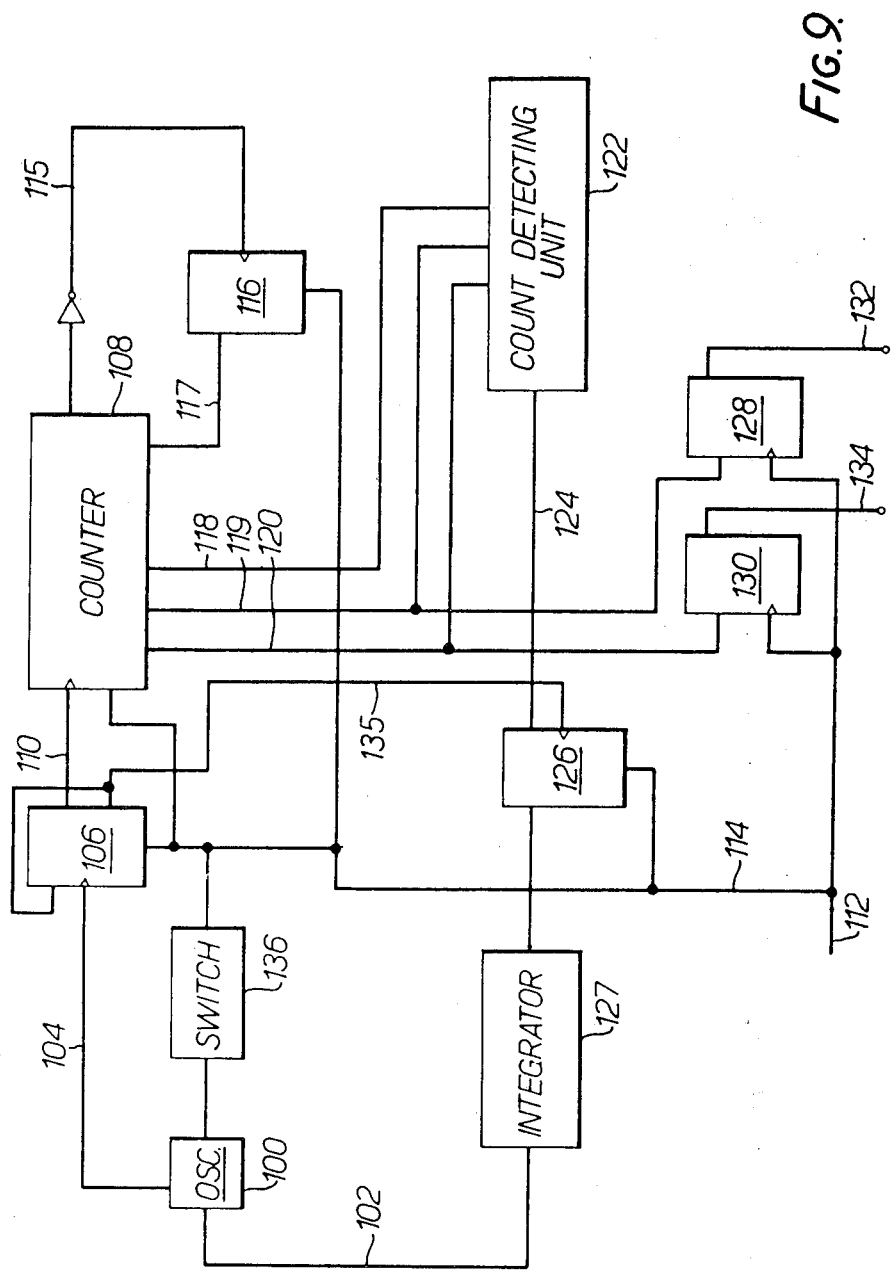
FIG. 9 is a block diagram of the decoder of the system.
Figure 14:
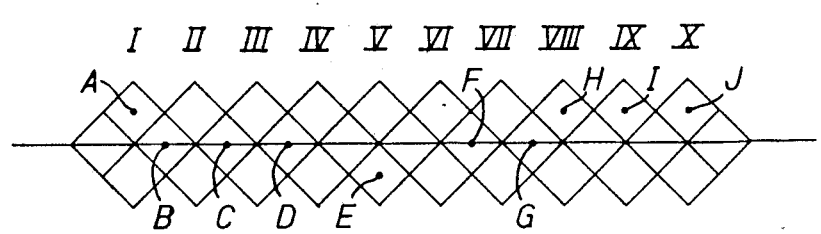
FIG. 14 shows maps similar to those of FIG. 3 but for the modified system.
Figure 16:
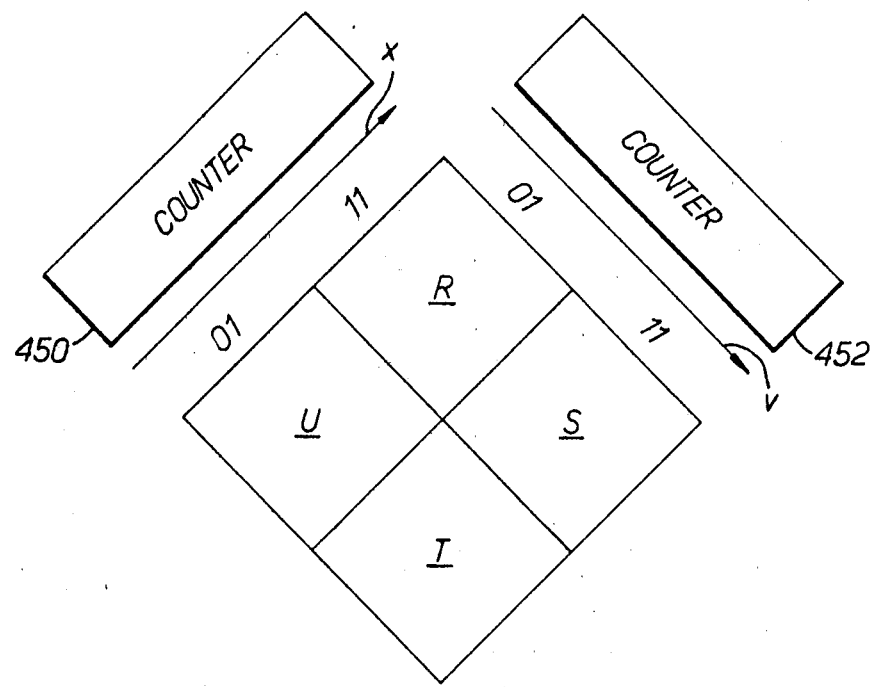
Figure 17:
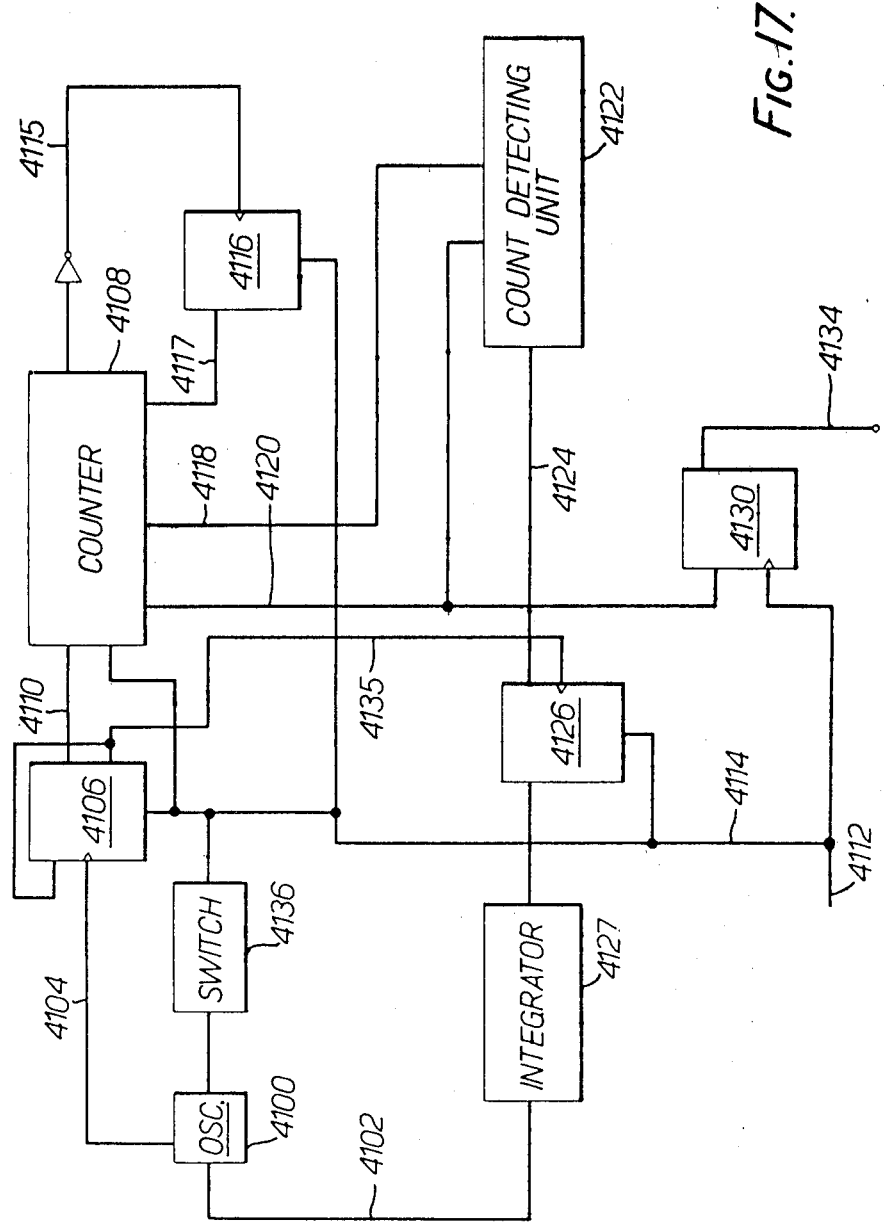
Figure 18:
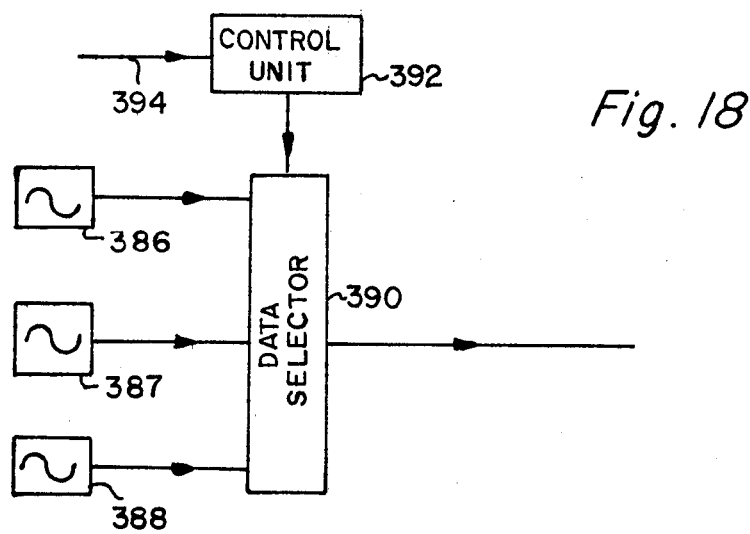

FIG. 16 corresponds to FIG. 6 and shows a modified view of the maps of FIG. 14 for the modified system;

FIG. 17 corresponds to FIG. 9 but shows the decoder of the modified system;

FIG. 18 shows a block circuit diagram of another form of the system; and

Figure 19:
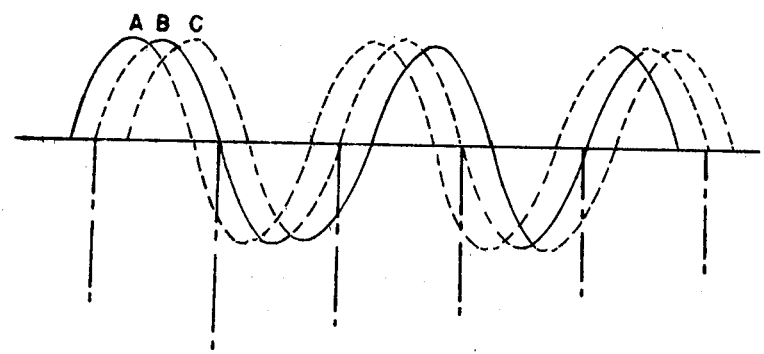

FIG. 19 shows waveforms used in the system of FIG. 18.

In the systems to be described, digital data is encoded by adjusting the time position of each transition of a rectangular waveform with respect to the immediately preceding transition. More specifically, in the first system to be described the time position of each transition with respect to the preceding transition is dependent on the value of two bits of the digital data. Clearly, each pair of bits can have any one of four values: 11, 10, 01 or 00. The time position of each transition is therefore dependent on which of these four values a respective pairs of bits has.

Figure 1:
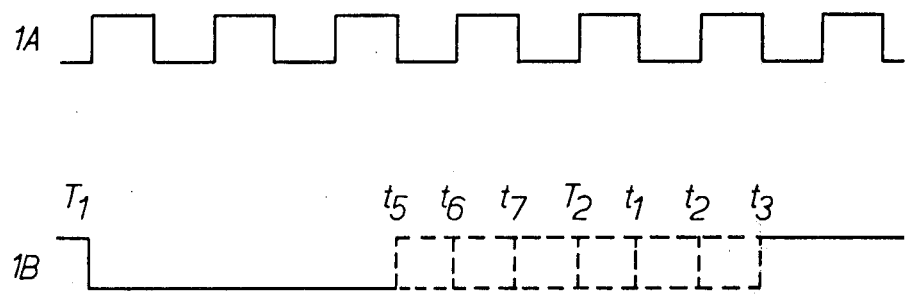
FIGS. 1 and 2 show waveforms for explaining how digital data is encoded in the system.

FIG. 1 explains the principle of operation in more detail. FIG. 1A shows the basic clock of the system (in fact, the clock pulses themselves run at twice the frequency shown and the clock periods, shown in FIG. 1A, are defined by the positive edges of each such clock pulse). FIG. 1B represents the encoded waveform and time T1 shows the time position of a previous transition of this waveform. Immediately after transition T1, the system begins to encode the next pair of bits and will make the next transition (this time from negative to positive) at a time position dependent on the value of this pair of bits. If the pair of bits is 00, then the system makes the next transition at time T2 which is spaced from the transition T1 by eight periods of the basic clock shown in FIG. 1A. If the bits are 01, then the system can make the transition either at time $t_7$ or at $t_1$, that is, either one clock period earlier than, or one clock period later than, time T2. If the pair of bits to be encoded is 10, the system can make the transition either at time $t_6$ or $t_2$, that is, either two clock periods earlier than, or two clock periods later than, time T2. Finally, if the pair of bits are 11, then the system can make the transition at the time $t_5$ or $t_3$, that is, either three clock periods earlier than, or three clock periods later than, time T2.

Immediately after the system has made the transition, it then begins encoding the next pair of bits—and these are encoded in similar fashion, that is, by appropriately positioning the next transition (which will of course change from positive to negative) in relation to the transition just made. Thus, if a transition has occurred at $t_7$ (indicating bit 01), and the next pair of bits to be encoded is 00, then the next transition will take place eight clock periods after $t_7$. If, instead, the next pair of bits to be encoded were, for example, 11, then the next transition could either take place five clock periods after $t_7$ or eleven clock periods after; and so on for the other possible values for each pair of bits. In other words, the time position of each transition is fixed (in dependence on the value of the respective pair of bits as explained) in relation to the immediately preceding transition.

Figure 2:
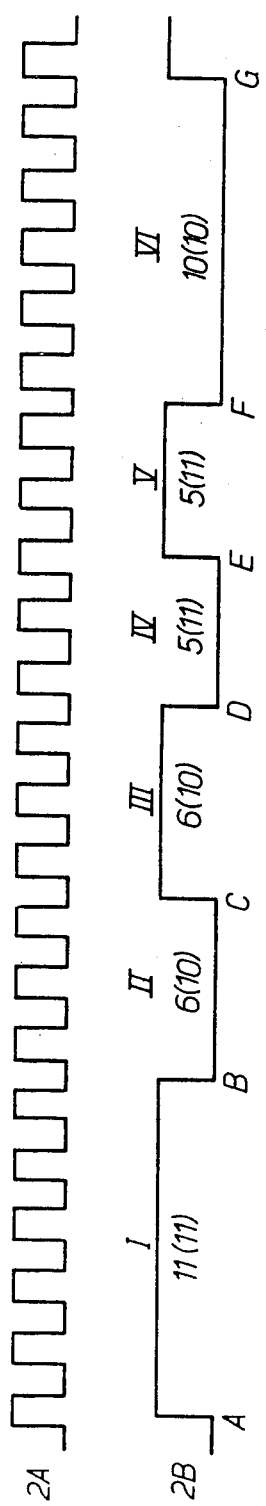

FIG. 2 explains the process in more detail. FIG. 2A shows the basic clock periods again.

FIG. 2B shows the output waveform representing the encoded data. The data encoded in FIG. 2B is 111010111110, and the respective pair of bits encoded in each of the pulses I to VI of FIG. 2B is shown in brackets within each pulse. Shown immediately outside the brackets within each pulse is the length of the pulse in terms of the number of clock periods of FIg. 2A. Thus, transition B occurs eleven clock periods after transition A because the first pair of bits to be encoded is 1,1 (it could instead have occurred five clock periods after A). The next pair of bits to be encoded are 10 and the system has produced a transition C which is six clock periods after transition B (it could instead have positioned C at ten clock periods after B).

During pulse III, the system is encoding the bits 10 and the system has chosen to position transition D six clock periods after transition C (it could instead have positioned D at ten clock periods after C).

During pulse IV, the bits to be encoded are 11 and the system positions transition E at five clock periods after transition T4 (it could instead have positioned E at eleven clock periods after D).

During pulse V, the system is encoding the bits 11 and chooses the position transition F at five clock periods after transition E (it could instead have positioned F at eleven clock periods after E).

Finally, in pulse VI, the system is encoding the bits 10 and chooses to position transition G at ten clock periods after transition F (it could instead have positioned G at six clock periods after F).

Therefore, for each possible pair of data bits, except 00, the system has to choose whether to make the transition either before or after the datum point of eight clock periods from the previous transition. The manner in which the encoded part of the system makes this decision will now be considered. Basically, however, the system has to make the decision taking into account two factors.

First, the system has to ensure that the DC content of the encoded signal is zero in the long term. In other words, it has to ensure that the mean length of the positive pulses in the encoded waveform balances the mean length of the negative pulses. This requirement is imposed by the fact that a recorder for recording on magnetic tape has no DC response.

Secondly, the system has to ensure that there are no long term errors, that is, that on average, there is one transition for every eight clock periods. This requirement is mainly to aid decoding, as will be explained later.

The fact that the encoding part of the system has two choices for each pair of bits to be encoded (except 00) enables it to meet these two requirements and at the same time correctly encode each pair of data bits.

Figure 3:
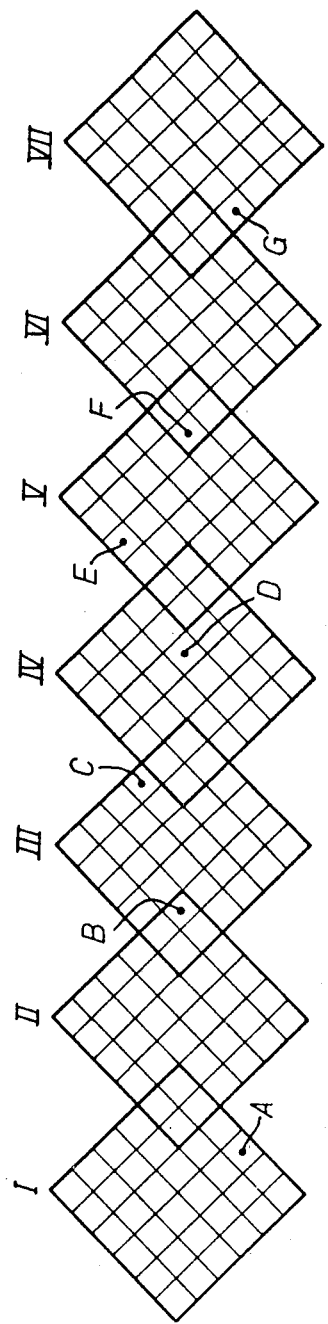
FIGS. 3 and 4 are diagrams of decision maps used in the encoder of the system.

The manner in which the system decides where to position the transitions can be represented by the maps shown in FIG. 3. The maps enable the effect of the time position of each transition on both the DC offset and on the overall timing to be plotted. Time is measured along the horizontal axis and DC offset along the vertical axis. There is one map for each transition, the centres of the maps being separated along the time axis by eight clock periods. Movement upwards indicates production of a positive DC offset and movement downwards indicates production of a negative DC offset. Thus, a positive pulse in the encoded waveform which has a length of more than eight clock periods will create a positive DC offset, and likewise a negative pulse having a length of more than eight clock periods will create a negative DC offset. However, a positive pulse having a length less than eight clock periods will produce a negative DC offset and a negative pulse having a length of less than eight clock periods will produce a positive DC offset.

It follows from this that a transition occurring eight clock periods after the previous transition shifts the corresponding point from its position on one of the maps to exactly the same position on the next map. A transition occurring at any other time spacing, however, will produce a change in timing and a change in DC offset and the corresponding point will therefore shift to a different position on the next map.

The maps of FIG. 3 in fact illustrate, by way of example, the encoded waveform of FIG. 2B.

In FIG. 3, it is assumed that the data previously arriving has brought the system to point A on the Map I (that is, corresponding to transition in FIG. 2B). In the first pulse I of the encoded waveform shown in FIG. 2B, the system is encoding bits 11. As shown in FIG. 2B, the system encodes these bits by making transition B occur eleven clock periods after transition A and by producing a positive pulse. The point on the Map I therefore moves from A to B on Map II because this has the effect of producing a positive DC offset and late timing. Because transition B is three clock periods later than the datum value of eight clock periods, point B on Map II is three clock periods later than point A on Map I. Points C, D, E, F and G on Maps III, IV, V, VI and VII respectively correspond with transitions C to G of FIG. 2B.

If the system can be arranged so that the points representing the successive data transitions always lie within the boundaries of their respective maps, the result will be that no long term DC offset or timing errors can arise. It will be apparent from FIG. 3 that each map has a width (in this example) of 12 clock periods and that the maps overlap by four clock periods. This means that a total timing error of more than six clock periods cannot occur in this example. Thus, if a data transition occurs at the extreme left hand edge of Map I, the time instant eight clock periods later will be at the extreme left hand edge of Map II. Therefore, if the data being encoded is 01, 10 or 11, the transition must occur later (rather than earlier) than this time instant—because otherwise the corresponding map point would not be on Map II. Similarly, if a data transition occurs at the extreme right hand edge of Map I, the time instant eight clock periods later will be at the extreme right hand edge of Map II. Therefore data of 01, 10 or 11 must be encoded earlier, rather than later, than this instant otherwise the transition will not be on Map II.

Figure 4:
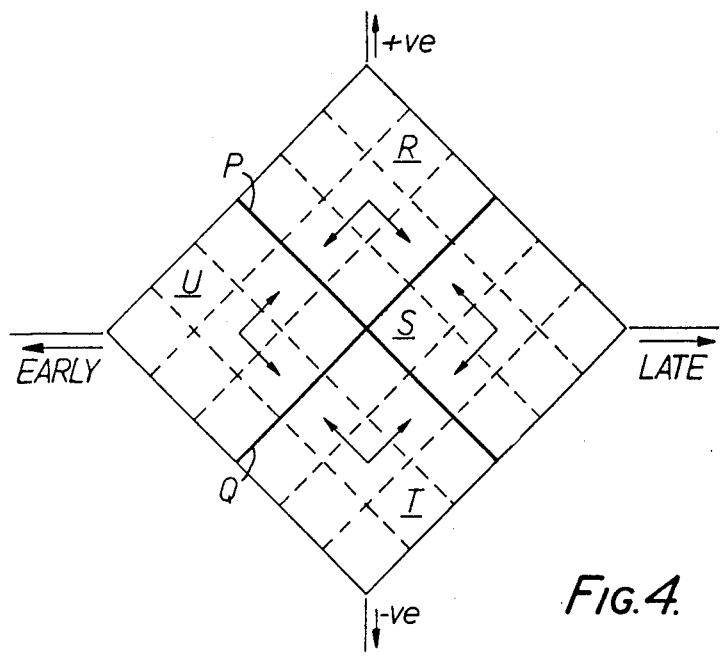

FIG. 4 shows how this is achieved.

FIG. 4 shows a succession of Maps superimposed on each other for ease of explanation to produce a composite map. Lines P and O divive the composite map into four sub-areas R, S, T and V. If, now, the system is arranged so that the point on the composite Map can only move in the direction of the arrows shown within each of the sub-areas R, S, T and U, the point will always remain on the composite Map, that is, the points corresponding to the successive data transitions will each fall on their respective Maps. This follows from the fact that the longest move which can be made on the composite Map is a jump of three of the small squares (because the system can only move each transition either three clock periods more or three clock periods less than the basic datum of eight clock periods). In other words: where a point on the composite Map is in sub-area R, movement to the next point must be constrained to be movement diagonally downwards (to right or left); when a point is in sub-area S, movement to the next point must be constrained to be movement diagonally to the right (upwards or downwards); when a point is in sub-area T, movement to the next point must be constrained to be movement diagonally upwards (to right or left); and when a point is in sub-area U, movement to the next point must be constrained to movement diagonally to the right (upwards or downwards).

Figure 5:
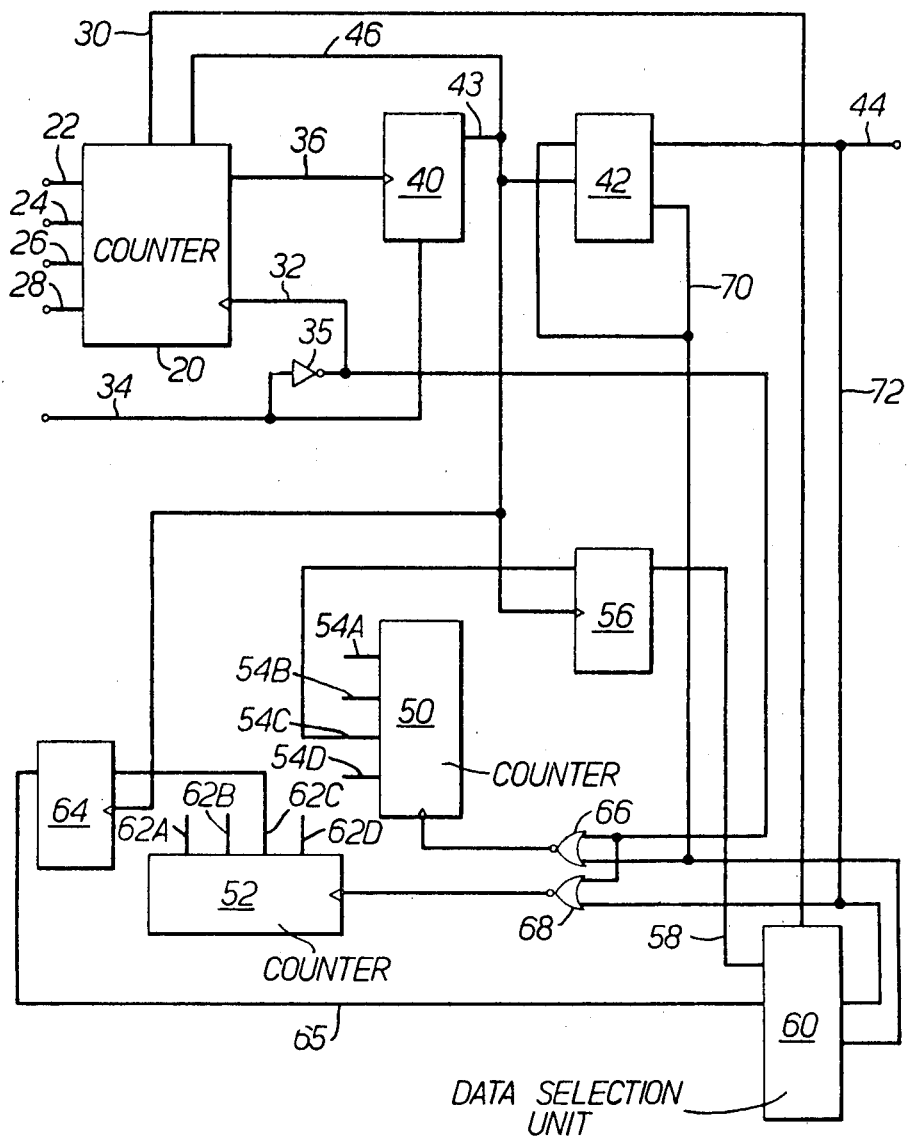
FIG. 5 is a block circuit diagram of the encoder of the system.

The manner in which the encoder achieves this will become apparent from the following description of one form which the encoder can take, with reference to FIG. 5.

As shown in FIG. 5, the encoder has an input counter 20 with four input lines 22, 24, 26 and 28 by means of which the initial state of the counter can be set up. Lines 22 and 24 are connected to receive the two bits to be encoded at any time, while lines 26 and 28 are preset to binary 0 and binary 1 respectively for a purpose to be described. The data bits arriving on lines 22 and 24 may arrive from buffer storage (to ensure that a pair of bits is always ready for encoding).

A signal on a line 30 controls whether the counter counts up or down, and clock pulses, at four times the data bit rate, are fed to an input line 32 of the counter from a line 34 via a delay circuit 35. The counter produces an output signal when it has reached a count of binary 000 and this is fed on an output line 36 to a latch 40 which trips a trigger circuit 42, via a line 43, to produce a transition on an output line 44 carrying the data output waveform. The latch 40 is reset by the next clock pulse occurring on line 34, and delay circuit 35 ensures that this takes place half a clock period after the count output occurs on line 36.

The output of the latch 40 also energises a control line 43 which causes the next pair of bits on lines 22 and 24 to be loaded into the counter (together with the bits 1 and 0 on lines 28 and 26).

The operation of the encoder as so far described will now be explained.

It will be assumed that a transition on the encoded waveform has just occurred. Latch 40 has therefore just energised its output line 43 and tripped the trigger circuit 42. At the same time, line 46 is energised and this loads the next pair of bits into the counter 20. Because lines 28 and 26 are always set to binary 1 and binary 0, the count loaded into the counter 20 will always be greater by decimal 8 than the count loaded in on lines 22 and 24. In response to the clock pulses arriving at the counter on line 32, the counter counts up or down (depending on the state of line 30) and produces an output signal on line 36 when the count reaches 0000. If the data to be encoded is 00, then the output signal on line 36 will be produced after eight clock periods have occurred, whether the counter is counting up or down. However, if the data bits to be encoded are 11, 10 or 01, then the signal on line 36 will be produced either after more than eight clock periods have occurred, or after less than eight clock periods have occurred, according to whether the counter is counting down or up, respectively, and the amount by which the actual number of clock periods is greater than, or less than, eight, will depend on the values of the data bits to be encoded. Thus, if the data bits to be encoded are 11, and the counter is counting down, eleven clock periods will be required before the counter has been counted down to 0000 and produces the output on line 36, and conversely only five clock periods will be required to produce this state if the counter is counted up. When the input data is 10, six clock periods will be required if the count is counting down and ten if it is counting up. When the data bits are 01, seven clock periods will be required if the counter is counting down and nine if it is counting up.

In this way, therefore, the counter may be controlled to produce an output on line 36 at the time when the next transition is to occur, by appropriately energising line 30 so as to determine whether the counter counts up or down.

The decision whether counter 20 is to count up or down is made by an electronic representation of the Maps shown in FIGS. 3 and 4. FIG. 6 shows the composite Map of FIG. 4 redrawn with the data transitions shown in FIG. 2B and FIG. 3 plotted on it. The composite Map is represented by two further counters 50 and 52 in the encoder of FIG. 5 which are also shown in FIG. 6. Each counter is arranged so that it counts up to decimal 8 and then repeats. Referring to FIG. 6, counter 50 represents movement on the Map in the direction of the arrow X or the reverse direction, and the counter 52 represents movement on the Map in the direction of the arrow Y or the reverse direction. The counts from decimal 1 to decimal 6 of the two counters are shown in FIG. 6 along the respective sides of the Map (in each case the least significant binary digit is given last). In this way, the counts of the two counters together define the position of the current point on the Map. When the point on the Map is in sub-area R, the most significant digit of the count values shown in FIG. 6 for counter 50 will always be binary 1 and the most significant digit of the count values shown in FIG. 6 for counter 52 will always by binary 0. In sub-area S, the most significant digit shown in FIG. 6 for both counters will always be binary 1. In sub-area T, the most significant digit shown in FIG. 6 for counter 50 will always be binary 0 and the most significant digit shown in FIG. 6 for counter 52 will always be binary 1. In sub-area U, the most significant digits shown in FIG. 6 for both counters will always be binary 0.

as to follow the point on the Map as it leads to its new position.

The prohibited movements on the composite Map are not shown in Table A. Thus, if the point is in sub-area R on the Map and the data output signal is HIGH (that is, the previous transition was a positive-going transition), the point on the Map cannot move in the LATE direction because this would be in a prohibited direction as explained in connection with FIG. 4, and this movement is therefore omitted from the Table (as are the other prohibited movements).

TABLE A

| LEVEL OF DATA OUTPUT SIGNAL | SUB-AREA | MOST SIGNIFICANT DIGITS OF COUNTERS 50 AND 52 | COUNTER TO BE COUNTED | LATE OR EARLY TRANSITION REQUIRED | COUNT DIRECTION REQUIRED FOR COUNTER 20 |
|---|---|---|---|---|---|
| HIGH | R | 1, 0 | 50 | EARLY | UP |
| LOW |   |      | 52 | LATE  | DOWN |
| HIGH | S | 1, 1 | 50 | EARLY | UP |
| LOW |   |      | 52 | EARLY | UP |
| HIGH | T | 0, 1 | 50 | LATE  | DOWN |
| LOW |   |      | 52 | EARLY | UP |
| HIGH | U | 0, 0 | 50 | LATE  | DOWN |
| LOW |   |      | 52 | LATE  | DOWN |

The other states, 000 and 111, of the counters 50 and 52 cannot be entered as far as the decision Map is concerned, except initially when power is applied. After the occurrence of the first "1" in the data stream, the move will be onto the next 6×6 Map of FIG. 6 and all further moves will be constrained within the Map.

If synchronising words of block markers are to be used, a transition timing of 4 or 12 clock periods may be used which effectively expands the Map to the full 8×8 capability of counters 50 and 52.

As movement on the Map takes place diagonally (that is, in the direction of arrow X or of arrow Y or in the reverse direction) this can be plotted by changing the count of one, only, of the counters 50 and 52. Thus, considering a point in sub-area R, if the next transition is to occur late (that is, more than 8 clock periods after the previous transition) and to produce a negative DC offset, then it will be counter 52, not counter 50, whose count has to change to plot the new position on the Map. Such a condition can of course only arise if the previous transition was a negative-going transition, that is, if the data output waveform had been brought to a binary LOW level by that transition; this follows from the fact that a late transition can only produce a negative DC offset in a negative pulse of the data output waveform. Similarly if the current point on the Map is in sub-area R, and the previous transition was a positive-going transition to a binary HIGH level, then the point on the Map must move diagonally downwards and to the left to produce an early transition and, again, a negative DC offset; that is the point must move in the direction opposite to the arrow X, and it must therefore be counter 50 whose count changed, not counter 52. This process can be repeated for points in each of the other sub-areas S, T, U and the following Table A is therefore produced which indicates for points in each of the four sub-areas whether the next transition of the data input signal is to occur early or late, taking into account whether the previous transition has taken the data signal to binary HIGH or binary LOW. In other words, the Table indicates whether the counter 20 is to count up or down. In addition, the Table indicates which of the two counters 50 and 52 is to be counted so FIG. 5 shows how the counters 50 and 52 are connected up to carry out the required decisions. The Figure shows the four digit output lines 54A, 54B, 54C and 54D of counter 50. Line 54C carries the most significant digit of the count values shown in FIG. 6 and this line is connected through a latch unit 56 to one input 58 of a data selection unit 60. Similarly, counter 52 has four digit output lines 62A, 62B, 62C and 62D. Line 62C carries the most significant digit of the count values shown in FIG. 6 and this line is connected through a latch 64 to a second input line 65 of the data selection unit 60. Clock signals are fed to the counters 50 and 52 through gates 66 and 68. The second input of gate 66 receives a signal on a line 70 from the trigger unit 42 which is the inverse of the data transitions produced by the trigger unit on the line 44. The second input of gate 68 is connected by line 72 to receive the actual data transitions.

In addition, lines 70 and 72 are connected to further inputs of the data selection unit 60.

When a data transition occurs, the output signal on line 43 from latch 40 causes latches 56 and 64 to detect the binary values of the digits of the counts of counters 50 and 52 on lines 54C and 62C and to feed these binary values to lines 58 and 65 of the data selection unit 60. Substantially simultaneously, trigger 42 produces the data transition and lines 70 and 72 therefore feed to the gates 66 and 68, and to the data selection unit 60, information indicating whether the data output signal is now at binary HIGH or binary LOW.

The data information unit 60 therefore not only now has information (on lines 70 and 72) indicating the binary level of the data output signal but also has information (on lines 58 and 66) indicating in which sub-area of the map the system is currently operating. As shown in the TABLE above, this enables the data selection unit to determine when the counter 20 is to count up or down and it therefore energises line 30 appropriately.

In addition, the signals on lines 70 and 72 ensure that only an appropriate one of the gates 66 and 68 is open so that only the correct one of the counters 50 and 52 is counted.

Specific examples will now be considered with reference to FIG. 2B and the map of FIG. 6.

As shown in FIG. 2B, at time A, there is a positive-going transition so that the output signal is at binary HIGH. The next pair of bits to be encoded are 11. As shown in FIG. 6, it is assumed by way of example that the corresponding position on the map is point A, that is, in sub-area T. Point A therefore corresponds to the count of 011 in counter 50 and the count of 110 in counter 52.

At time A, trigger 42 (FIG. 5) produces the positive-going data transition on line 44, therefore generating a binary 1 on line 72 and a binary 0 on line 70.

At the same time, the output on line 43 causes the latches 56 and 64 to read the digit values of the counts of counters 50 and 52 on lines 54C and 62C and to feed these values on to the input lines 58 and 65 of the data selection unit 60; these digit values will be 0 and 1 respectively.

The TABLE shows that the data selection unit 60 will respond to the input data received by determining that the next transition must be late, and it will therefore set the line 30 so that the counter 20 commences to count down. The counter will count for eleven clock periods until it reaches the count of 0000 and produces the next data transition B.

The signals latched onto lines 70 and 72 during this process ensure that gate 66 is held open and gate 68 closed. Therefore counter 50 will count eleven clock periods while counter 52 will receive no clock pulses. Therefore, the count setting 111 of counter 52 will not change, but the count setting of counter 50 will switch from 011 to 110 (because the first eight clock periods will count it through a complete count cycle back to 011 and the final three clock periods will count it on to 110).

The states of the counters 50 and 52 therefore now indicate that the system has reached point B (FIG. 6) on the map, corresponding to a count of 110 in each of counters 50 and 52.

Transition B is a negative-going transition, and trigger 42 will therefore hold line 72 at binary 0 and line 70 at binary 1. At the same time, the output on line 43 (FIG. 5) will cause the next pair of data bits (10) to be loaded into the counter 20 and will cause the latches 56 and 64 to read out the binary values on lines 54C and 62C and to feed them to the data selection unit 60.

The data selection unit 60 therefore now determines that the current position on the map is in sub-area S (because data lines 58 and 66 will be at binary 1). As shown in the TABLE above, the data selection unit 60 will therefore set line 30 so that the counter now commences to count up from its initial loading of 1010, thus requiring six clock periods to count it to 0000. Because of the new settings of lines 70 and 72, gate 66 is now closed and gate 68 is now open. Counter 52 therefore also counts six clock periods. Therefore counter 52 alters its count from 110 to 100, which it reaches when counter 20 has been counted down to 0000 and the next transition occurs at time C (FIG. 2B).

The encoder inputs the next pair of data bits and the process repeats.

As explained above, the data bits arriving on lines 22 and 24 to the counter 20 are arranged to arrive from buffer storage in order to ensure that a pair of bits is always ready for encoding. This buffer storage, and its associated control equipment, will now be described with reference to FIGS. 7 and 8.

Figure 7:
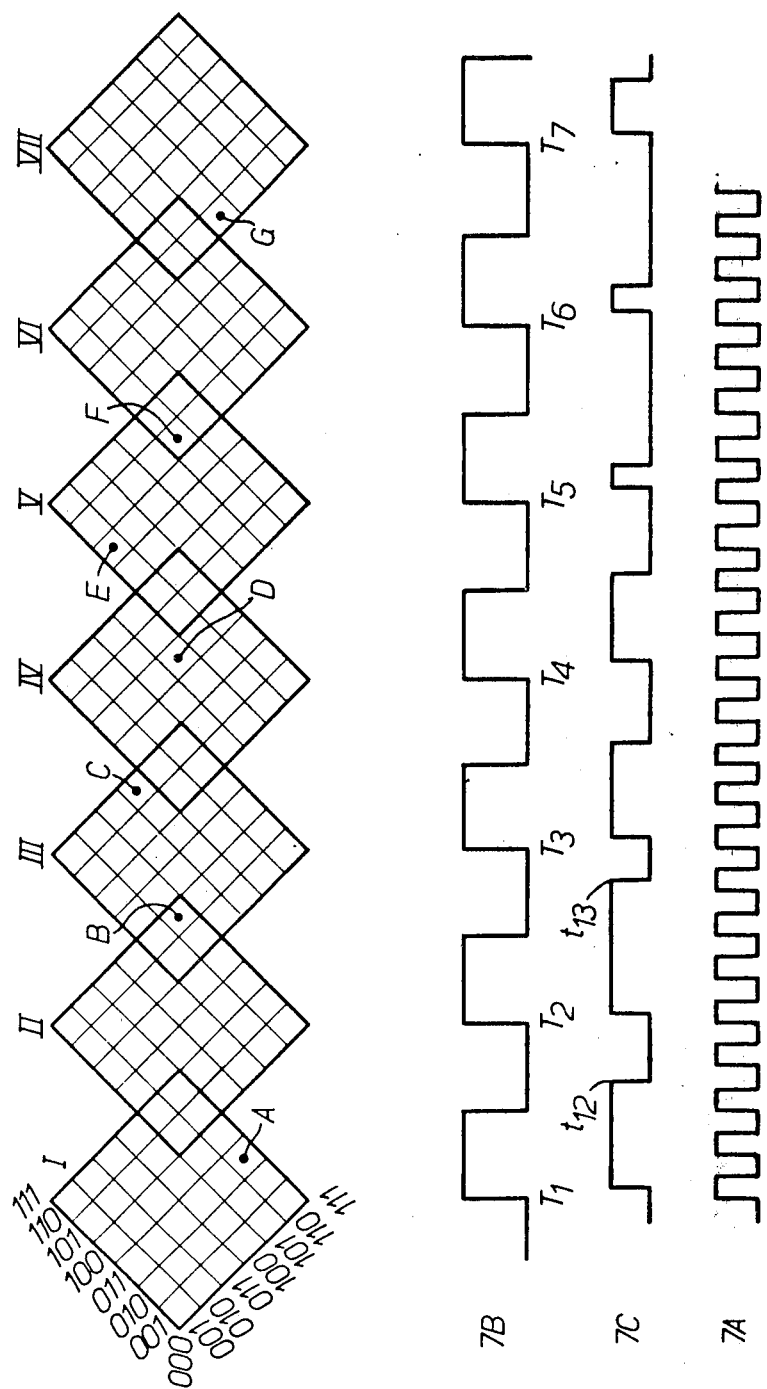
FIG. 7 is a timing diagram, using the map of FIG. 3, for explaining the operation of a data input arrangement for inputting data bits to the encoder of FIG. 5.

FIG. 7 shows the successive individual Maps of FIG. 3 redrawn with the counts of counters 50 and 52 indicated alongside.

As is apparent from previous explanation and from FIGS. 3 and 7, the Maps overlap each other, the overlap period being four clock periods in length. Therefore, it is not possible to control the input of the data bits on lines 22 and 24 (FIG. 5) simply by reference to the clock pulse waveforms, such as by, for example, regularly clocking successive pairs of bits to be encoded onto the lines 22 and 24 in synchronism with the successive Maps I, II, III . . . . For example, if the successive pairs of bits were clocked onto the lines 22 and 24 at the beginning of the corresponding Maps I, II, III . . . then this would be unsatisfactory if, say, the data transition relating to Map I occurred during the overlap period, that is, after the beginning of Map II; in such circumstances, the pair of bits relating to Map I would still be present on lines 22 and 24, because they would not yet have been encoded, at the time when the bits relating to Map II were due to arrive.

Figure 8:
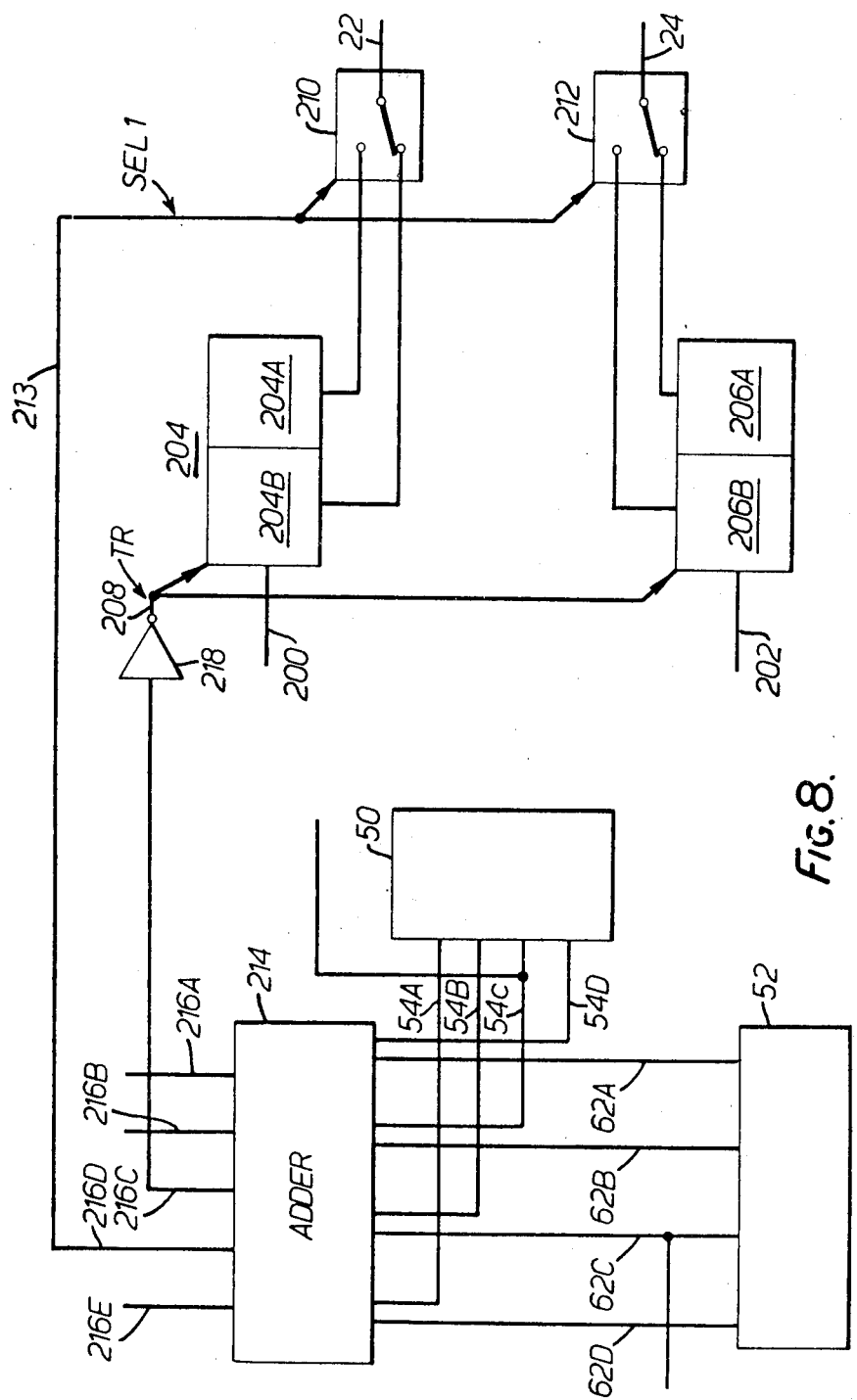
FIG. 8 is a block diagram of the data input arrangement for receiving data bits to be encoded and for applying them to the encoder of FIG. 5 at the correct time instants.

FIG. 8 shows diagrammatically how the system deals with this problem.

As shown in FIG. 8, the data bits to be encoded arrive on two parallel lines 200 and 202 which are respectively connected to each of two 2-stage shift registers 204 and 206. Each pair of bits to be encoded is presented in parallel on lines 200 and 202, line 200 carrying one of the pair of bits and line 202 carrying the other one. The data bits are fed into the respective shift registers 204 and 206 clocked through by a regularly occurring timing reference signal TR occurring on a line 208.

Therefore, the data bit in stage 204A represents one of a pair of bits to be encoded and the other of that pair of bits is in stage 206A. The data bit in stage 204B is one of the bits of the next pair to be encoded and the other one of that pair of bits is in stage 206B.

The outputs of the stages 204A and 204B are connected to a switch 210 which can be operated to connected either one of the stages to the line 22 (see FIG. 5). Similarly, the outputs of the stages 206A and 206B are connected to a switch 212 by means of which either of these outputs can be connected to line 24 (FIG. 5). The switches 210 and 212, which would in practice be electronic switches, are controlled by a selecting signal SEL1 on a line 213.

The operation of FIG. 8 will now be described with reference to FIG. 7.

FIG. 7A shows the successive clock periods corresponding to the waveform of FIG. 2A. FIG. 7B shows the timing reference TR applied to the line 208 of FIG. 8, and shows that it is a square wave synchronised with the timing reference points T1, T2 . . . of FIG. 7, that is, the midpoints of the Maps I, II . . . . FIG. 7C shows the selecting signal, SEL1, which controls the switches 210 and 212. Each positive-going edge of the signal SEL1 occurs half a clock period after a positive-going edge of the timing reference TR. Each negative-going edge of SEL1 is positioned according to the position of the data transition of the corresponding Map. Thus, if the data transition on a Map occurs before the timing reference point T1, T2 . . . of that Map, SEL1 goes LOW before TR goes LOW, but if the data transition occurs after the timing reference of that Map, SEL1 stays HIGH until after it has occurred. Signal SEL1 is connected to control the switches 210 and 212 so that the switches connect the shift register stages 204A and 206A to lines 22 and 24 when SEL1 is HIGH and connect shift register stages 204B and 206B to lines 22 and 24 when SEL1 is LOW.

Therefore, when SEL1 is HIGH, this indicates the system is stepping through the second half of the current Map but before a data transition has occurred. When SEL1 is LOW after the timing reference for a Map has occurred, this signifies that the data has been encoded in the current Map and the system is now effectively operating in the next Map (even though the end of the previous Map may not actually have occurred).

Considering the example illustrated in FIG. 7 in more detail, prior to time T1 the data bits to be encoded during Map I (transition A) will be present in the stages 204B and 206B and SEL1 will connect these stages to lines 22 and 24. However, during this time, no transition will take place (because the values of the pair of bits do not require it). At time T1, signal TR goes HIGH and clocks the data bits which were in stages 204B and 206B into stages 204A and 206A and clocks new bits (transition B) into stages 204B and 206B. Immediately thereafter, SEL1 goes HIGH and stages 204A and 206A are now connected to lines 22 and 24.

At A the data transition for Map I occurs, and SEL1 ensures that the correct stages 204A and 206A are connected to lines 22 and 24 at this time.

At time T2, TR clocks the data bits for transition B into stages 204A and 206A, and clocks the data bits for transition C into stages 204B and 206B. When transition B occurs in Map II, therefore, SEL1 is connecting the correct stages to lines 22 and 24.

At T3, TR clocks the data bits for transition C into stages 204A and 206A and clocks the data bits for transition D into stages 204B and 206B. Again, therefore, SEL1 ensures that when transition C occurs, the correct bits are on lines 22 and 24.

At T4, signal TR clocks the bits for transition D into stages 204A and 206A and the bits for transition E are simultaneously clocked into stages 204B and 206B. Therefore, when transition D occurs, SEL1 is HIGH and therefore the appropriate bits are present on lines 22 and 24.

When transition E occurs, SEL1 will be negative and will therefore connect stages 204B and 206B (which contain the bits for transition E) to lines 22 and 24, and therefore the appropriate data bits are presented to the encoder.

At T5, the bits for transition F are clocked into stages 204B and 206B. Signal SEL1 then goes HIGH but reverts to LOW before transition F so as to ensure that the bits for this transition are fed to lines 22 and 24.

Finally (in this example) at T6 the bits for transition G are fed into stages 204B and 206B. When transition G occurs, SEL1 is LOW again so as to connect these stages to lines 22 and 24.

In this way, the shift registers enable the incoming data bits to be regularly clocked, and the switches 210 and 212 ensure that the correct bits are always applied to the input lines 22 and 24 of the encoder.

The signals TR and SEL1 are derived from the counters 50 and 52 of the encoder (see FIG. 5) as shown in FIG. 8.

FIG. 8 shows the counters 50 and 52 of FIG. 5 redrawn and with their count output lines 54A to 54D, and 62A to 62D connected to an adder 214. Lines 54C and 62A are the third significant digit output lines of the counters which are of course also connected to the latches 56 and 64, respectively, of the encoder as shown in FIG. 5, but these latches and the remaining parts of the encoder shown in FIG. 5 are omitted from FIG. 8.

The adder 214 has five output lines 216A, 216B, 216C, 216D and 216E, line 216A being the least significant bit output.

The signal TR is derived from the adder output line 216C via an inverter 218. The signal SEL1 is derived from the adder output line 216D.

The production of the signals TR and SEL1 will now be explained with reference to Table B below which shows the binary outputs produced on lines 216A to 216D corresponding to successive decimal values of its sum output.

TABLE B

| 216D | 216C | 216B | 216A | DECIMAL |
|------|------|------|------|---------|
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |
| 0 | 0 | 0 | 0 | 16 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |
| 0 | 0 | 0 | 0 | 16 |

As explained in connection with FIG. 5, the counters 50 and 52 receive the clock pulses alternately, via the gates 66 and 68 shown in FIG. 5. In other words, each clock pulse is either fed to counter 50 or to counter 52. However, each counter 50, 52 has a maximum count of decimal 8 (1000), and therefore the output of adder 214 does not increase progressively from decimal 0 to decimal 16 and then repeat. Each time one of the counters 50, 52 reaches its maximum count (of decimal 8), and then reverts to its starting count (of decimal 1), the output of adder 214 will drop, by a count of decimal 8, and then recommence counting. Nevertheless, as shown from Table B, the output of the third significant bit line 216C will be unaffected by this step change—because the output of this bit line has one binary value ("0") for four successive count values followed by the other binary value ("1") for the next four count values. Therefore, the output line 216C is a square wave having a period equal to eight clock pulses of the waveform shown in FIG. 7A.

Therefore, assuming that the counters 50 and 52 are reset when the system is initially switched on, the output of the inverter 218 is the square wave shown in FIG. 7B, thereby producing the required signal TR.

As explained above, each time one of the counters 50, 52 reaches its maximum count, and then re-starts counting, the output of adder 214 will fall by a count equal to decimal 8. Therefore, as shown by Table B, the output on line 214D, the fourth significant bit output of adder 214, will change, from "0" to "1" or vice versa, depending on the count value in the adder at the time instant when the counter reaches its maximum count. This time instant will, in turn, depend on the time position of the last data transition, and will in fact coincide with the appropriate edge of the current Map.

Thus, referring to Map I in FIG. 7, counter 50 will be counted up (from an initial count of 011) during the data output pulse between transitions A and B (which has a length of eleven clock periods), counter 52 being held at a count of 110 during this process. At transition A, the decimal value of the sum of the counts of counters 50 and 52 (011 and 110) will be 9 (corresponding to binary 1001). As counter 50 counts up, the sum will increase to decimal 13 at time $t_{12}$ (FIG. 7) when counter 50 reaches its maximum count. The next clock pulse (the fifth since transition A) switches counter 50 back to zero. The sum output therefore falls to decimal 6 and the output on line 216D of the adder changes to binary 0, causing SEL1 to go LOW.

After two more clock pulses have occurred, counter 50 has reached a count of binary 010 and the output on line 216D of adder 214 changes to binary "1"; this corresponds to SEL1 going HIGH immediately after T2 (FIG. 7). After four further clock pulses (making a total of eleven since transition A), counter 50 will reach a count of 110 and this corresponds to transition B.

This process now repeats, but the clock pulses are now applied to counter 52. After one such clock pulse, counter 52 (which was at binary 110) will reach its maximum count and the next clock pulse will switch its count to zero. Once again, therefore, the sum output of the adder 214 will fall to decimal 7 and the output on line 216D, signal SEL1, will go LOW at $t_{13}$. After two further clock pulses, the binary output on line 216D will go HIGH again, corresponding to SEL1 going HIGH immediately after T3. Finally, after two more clock periods, making six in all, counter 52 will reach a count of 100, corresponding to transition C.

This process continues, with the clock pulses being applied alternately to counters 50 and 52. As will be apparent from FIG. 7, the signal SEL1 goes LOW each time the particular counter being counted reaches its maximum count and this corresponds to the time when the encoding process transfers from one Map to the next one.

The decoder in the system will now be described with reference to FIG. 9.

The decoder incorporates an oscillator 100 whose frequency is adjustable by means of a control signal on a line 102.

The output frequency of the oscillator 100 is fed on a line 104 to a toggle 106 and used to clock a counter 108 by means of a line 110.

Line 112 is the data input line of the decoder and by means not shown a short pulse is produced on line 112 in response to each transition of the data output signal from the encoder (no account being taken of the sign of this transition). These pulses are fed on a line 114 to reset toggle 106 and also to reset counter 108 to an initial condition in which it is loaded with a count of decimal 8 (binary 1000). When counter 108 has reached the count of 0000, it produces an output on a line 115 which sets a latch 116 so as to alter the count direction of the counter 108 by means of a line 117.

The counter 108 has output lines 118, 119 and 120 carrying the three least significant digits of the count. All three of these lines are connected to a detector 122 which detects when the count in the counter 108 is decimal 4 and produces an output on a line 124 to indicate this. Line 124 is fed to a latch 126 and the signal on the line 124 sets the latch. The latch 126 produces an output, whose sign depends on whether the latch is set or reset, and this current drives an inverting integrator 127 feeding line 102.

Lines 119 and 120 carrying the two least significant digits of the count of counter 108 are fed to respective latches 128 and 130 which also receive the pulses on line 112 and read the values of these two least significant digits in response to the occurrence of each pulse on line 112. The resultant outputs are produced on lines 132 and 134.

Line 114 is also connected to reset the latches 116 and 126 in response to each pulse from line 112.

The manner in which the system automatically controls the frequency and phase of the oscillator 100 to be the same as that of the clock in the encoder will further be described with reference to the waveforms of FIG. 10.

Figure 10:
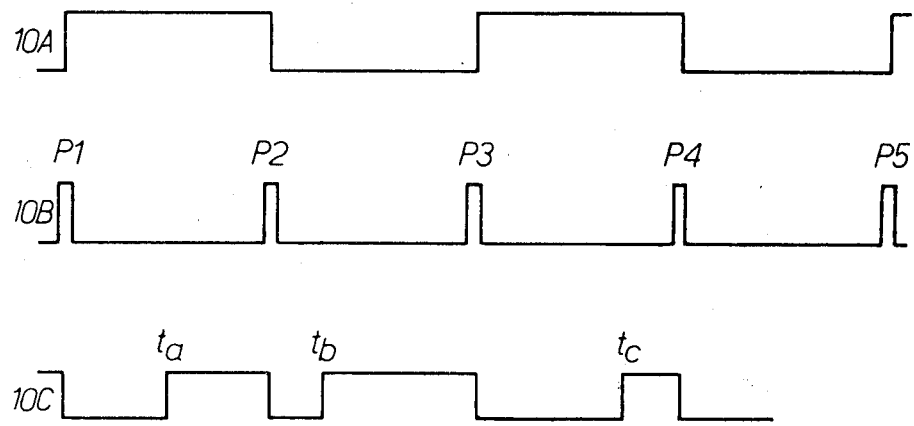
FIG. 10 shows waveforms occurring in the decoder of FIG. 9.

In FIG. 10, it is assumed for the sake of initial explanation that the data output signal from the encoder is as shown in FIG. 10A, that is, it is a regular waveform whose transitions are separated by eight clock periods. It thus represents binary data having the value 000000000 . . . .

FIG. 10B shows the pulses produced on line 112 in response to this data output signal from the encoder.

In response to the first pulse P1 of waveform 10B, latches 106, 116 and 126 are reset and the count of decimal 8 is loaded into counter 108 by means of its preset inputs. The counter now begins to count down in response to the clock pulses on line 110 from the oscillator 100 and toggle 106.

It will initially be assumed that these clock pulses have the correct frequency and phase (that is, their frequency is exactly equal to the clock periods of FIG. 2A and they are in phase with those clock periods).

FIG. 10C shows the state of the latch 126 and represents the output current which it feeds to integrator 127. Initially the latch is reset by pulse P1. At time $t_a$, however, the count of counter 108 will have reached decimal 4, and the detector 122 will detect this and set the latch 126 by means of a signal on the line 124. When the next pulse P2 (waveform 10) occurs, this will be exactly coincident with the eighth clock period (because the clock output of oscillator 100 is exactly equal in phase and frequency to the encoder clock), and latch 126 will be reset. Therefore, the positive and negative half cycles of the output current produced by the latch 126 will be equal, and the mean output of the integrator 127 will be unchanged.

It will now be assumed that the output frequency of the oscillator 100 becomes too high.

Therefore, during the next pulse of the data waveform, detector 122 detects that counter 108 has reached the count of decimal 4 at time $t_b$, that is, earlier than half way through the cycle, and will at this time set the latch 126. The latch 126 will not be reset until the third pulse P3 of FIG. 10 occurs. It is therefore apparent that integrator 127 will now produce a negative output on line 102 due to the inverting nature of the integrator and this will reduce the frequency of the oscillator 100.

During the next pulse of FIG. 10, it is assumed that the output frequency of the oscillator 100 is too slow. As shown, detector 122 will not detect that counter 108 has reached the count of 4 until time $t_c$, which is well after half way through the pulse and will at this time set the latch 126. The latch will be reset in response to pulse P4 (FIG. 10) and the result will be that integrator 103 will produce a positive output which will increase the frequency of the oscillator 100.

In this way, therefore, the frequency of the oscillator 100 will be automatically controlled to be equal to the clock frequency in the encoder.

In order to ensure that the output of the oscillator 100 will also be correctly in phase with the clock in the encoder, each pulse on line 114 actuates a switch 136 which resets the oscillator 100.

In order to determine the value of the two data bits represented by each transition of the data waveform, it is merely necessary to detect the time position of each transition relative to that of the preceding one in terms of the periods of the accurately controlled clock. Thus, in response to each pulse on line 112 the latches 128 and 130 read the states of the two least significant digits of the counter 108 and present these values on lines 132 and 134. Because the oscillator 100 is synchronised with the clock in the encoder, the values of these two least significant digits will represent the values of the encoded data bits.

Thus, if the time position of a pulse on line 112 with respect to the immediately preceding pulse represents data bits 00, the two pulses on line 112 will be separated by exactly eight clock periods and therefore counter 108 will have been counted down from the initial value of decimal 8 or binary 1000 to binary 0000, and lines 132 and 134 will therefore each carry a binary 0.

The other possible pairs of bits will of course each be encoded by producing a transition which is spaced from the preceding transition by either of two possible numbers of clock periods. The same decoding principles apply.

For example, if the bits encoded are 01, and have been encoded into a transition occurring early, that is, seven clock periods after the preceding one, then when the relevant pulse is received on line 112, the counter 108 will have counted seven clock periods from oscillator 100 and will have been counted down from binary 1000 to 1001, and the required data output of 01 will be produced on lines 132 and 134. If, instead, however, the bits 01 have been encoded by means of a transition occurring late, that is, nine clock periods after the previous transition, then the relevant pulse on line 112 would occur after the counter 108 had counted nine clock periods from the oscillator 100. The first eight of these would count the count down to binary 0000 and the loop provided by latch 116 would immediately switch the counter to start counting up instead of down. The ninth clock period would therefore cause the counter to count back to binary 1001, and again the correct data output of 01 would be produced on lines 132 and 134.

The same process is of course followed for the other pairs of data values.

The operation of the latch 126 is synchronised with the clock pulses produced by oscillator 100 by means of a line 135 which supplies the latch with pulses which are the inverse of those on line 110.

It will be apparent from the foregoing description that the data will be output on lines 132 and 134 at irregular intervals, because the data is output in synchronism with the data transitions on line 112 and these in turn are inherently irregular because their time positions depend on the values of each pair of encoded data bits.

The data output arrangement now to be described with reference to FIGS. 11 and 12 enables the data to be output at regular intervals.

As explained in connection with FIG. 9, the decoder operates by synchronising the oscillator 100 in frequency and phase with the clock frequency of the encoder. Each data transition on line 112 resets the counter to an initial count of 1000 and the clock pulses from the oscillator 100 then count the counter 108 down, its count when the next data transition on the line 112 occurs being such that the states of the least significant digits of the counter, as represented by the signals on the lines 119 and 120, represent the values of the encoded data bits.

Figure 11:
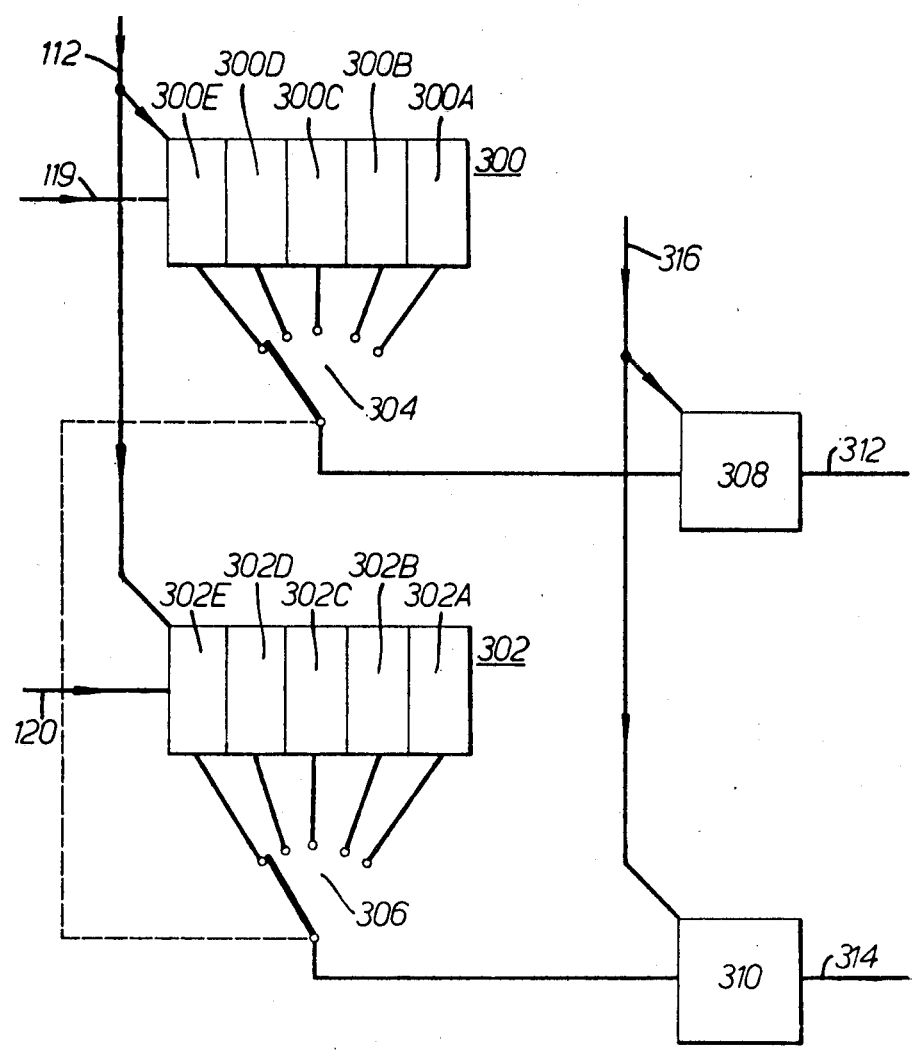
FIG. 11 is a block circuit diagram of a data output arrangement for feeding data out of the decoder of FIG. 9.

As shown in FIG. 11, the latches 128 and 130 are replaced by five-stage shift registers 300 and 302, connected to receive the least significant digits of the counts of the counter 108 on the lines 119 and 120 respectively. The data bits on lines 119 and 120 are clocked into the shift registers 300 and 302, and through their stages, by the data transition signals on the line 112 (see FIG. 10). The stage outputs of the stages 300A to 300E of register 300 are fed out to a selector switch 304, and the stage outputs of the stages 302A to 302E of the register 302 are fed out to a second selector switch 306. The selector switches 304 and 306 are joined together for operation by a selector signal SEL2 and feed their outputs to respective latches 308 and 310 which in turn feed their outputs on to output lines 312 and 314 under control of the timing signals occurring on line 316. The timing signals on line 316 are regularly spaced apart by eight clock periods and it is therefore necessary for the signal SEL2 to set the switches 304 and 306 so that the appropriate data bits are supplied to the latches 308 and 310, ready to be clocked out by the timing signals on line 316. If, for example, the data being encoded consisted simply of a stream of pairs of 00 bits (so as to be encoded by data transitions occurring eight clock periods apart), then the decoded bits on lines 119 and 120 will be fed into the shift registers 300 and 302 in synchronism with the timing pulses on line 316, and the switches 304 and 306 could be set to remain in a fixed position and selecting data bits from any of the register stages. However, normally the values of the pairs of data bits will vary and the data transitions representing them may occur earlier or later than the timing signals on line 316. If a data transition occurs earlier than the corresponding timing signal, then it is necessary for the switches 304 and 306 to be moved one stage to the left (i.e. to select data from the next earlier stage of each shift register). If two data transitions occur before the next timing signal, the switches 304, 306 must be switched two stages to the left, that is, to select the data from two stages earlier in the shift registers. If, on the other hand, the data transition occurs late, then the switches 304 and 306 must be switched to the right so as to select data from the next later stages in the register, or from two stages later, depending on whether the data transition takes place after one timing signal has occurred, or after two timing signals have occurred.

means responsive to the mean time spacing of the said transitions to adjust the frequency and phase of the said clock pulses to predetermined values, and means for counting the number of such clock pulses between consecutive said transitions so as to produce successive decoded outputs each representing the value of a respective one of the data units.

9. A system according to claim 8, including decoder receiving means for receiving and temporarily storing the said decoded outputs as they are respectively produced, and switching means operative at regularly spaced time intervals for consecutively selecting the decoded outputs from the decoder receiving means.

10. A data encoding system for encoding a succession of items of data each of which can have any one of a predetermined plurality of different values, comprising input means connected to receive the successive items of data in groups each consisting of the same predetermined plural number of data items, the particular combination and order of values of the items of data in each group defining the value of that group, means generating an electrical signal having successive transitions between predetermined signal values which are respectively positive and negative with respect to a datum value means defining for each possible group value a respective instantaneous time position of a corresponding said transition with respect to the time position of the immediately preceding transition, and means defining an alternative time position for at least one of the said group values, means defining a series of regularly occurring successive time instants, storage means defining for each said time instant two limiting amplitude values one positive and one negative with respect to a constant datum, the limiting values for each time instant being different from those for the immediately adjacent time instants and regularly increasing and decreasing in amplitude between maximum values which are separated by equal time separations along the series of time instants, whereby to define for each said group a respective map relating possible amplitude values for the time instants in that map, and selecting means connected to receive and assess the value of each said group and to control the instantaneous time position of the corresponding said transition accordingly, the selecting means including means operative to select one of the two possible said time positions for the said one group value so that the number of said time instants and the DC content which correspond to the electrical signal between that said transition and the immediately preceding said transition are represented by a point on the respective map.

11. A system according to claim 10 in which the time position corresponding to a particular one of the possible group values, with respect to the time position of the immediately preceding transition, has a single predetermined value and each other said group value can have either one of a respective pair of possible time positions.

12. A system according to claim 10, in which the items of data are items of binary data (bits).

13. A system according to claim 12, in which each group of items of data consists of two bits.

14. A system according to claim 13, in which the time position corresponding to the group of bits (0, 0) has a single predetermined value and the groups of bits (0, 1), (1, 0) and (1, 1) each have either of the said respective pair of possible time positions.

15. A system according to claim 13, including encoder receiving means for receiving and temporarily storing each of a plurality of pairs of bits to be encoded which are received at regularly spaced time intervals, and switching means for selecting each pair of bits from the receiving means in response to the said transition corresponding to the pair previously selected.

16. A system according to claim 15, in which the encoder receiving means comprises two multi-stage shift registers one connected to receive, serially, the first bits of each pair of bits to be encoded and the other connected to receive, serially and in synchronism with the first bits, the respective second bits of each pair of bits to be encoded, and means for regularly clocking the bits into and through the stages of the shift registers; and the switching means comprises means for selecting each pair of bits from the stages in the shift registers which they have reached in response to the occurrence of the transition corresponding to the pair previously selected.

17. A system according to claim 16, in which each multi-stage shift register comprises a two-stage shift register and there is a single, datum time spacing between the instantaneous time position of the said transition corresponding to one predetermined value of a pair of bits and the immediately preceding transition and there are a respective pair of possible time spacings between the instantaneous time position of the said transition corresponding to each other possible value for the pairs of bits and the immediately preceding transition, one of each respective pair of possible time spacings being greater than, and the other less than, the datum time spacing; and the means for regularly clocking the bits into and through the stages of the shift registers comprises means for clocking the bits into and through the stages of the shift registers in synchronism with timing signals spaced apart by the said datum time spacing, and the switching means comprises means for selecting each pair of bits from either the first or the second stages of the shift registers according to whether the said transition corresponding to that pair of bits occurs before or after the corresponding timing signal.

18. A data encoding system for encoding a succession of pairs of data bits, comprising two multi-stage shift registers one connected to receive, serially, the first bits of each pair of bits to be encoded and the other connected to receive, serially and in synchronism with the first bits, the respective second bits of each pair of bits to be encoded, means for regularly clocking the bits into and through the stages of the shift registers, switching means for selecting each pair of bits from the stages in the shift registers which they have reached at a respective predetermined time, and data encoding means connected to receive the successive selected pairs of bits from the said switching means and including means encoding each pair by adjusting the instantaneous time positions of a respective single transition in an electrical signal with respect to the time position of the immediately preceding transition and in dependence on the values of the bits in that group, there being two possible time positions for at least one of the said pairs, and in which one or other of these two possible time positions is selected in order that the encoded data meets one or more predetermined criteria, the said predetermined time respective to each pair of bits being the time of occurrence of the transition corresponding to the pair previously selected by the switching means.

19. A system according to claim 18, in which each multi-stage shift register comprises a two-stage shift register and there is a single, datum, time spacing corresponding to one predetermined value of a pair of bits and a respective pair of possible time spacings corresponding to the values of each other possible values for the pairs of bits, one of each pair of possible time spacings being greater than, and the other less than, the datum time spacing; and the means for regularly clocking the bits into and through the stages of the shift registers comprises means for clocking the bits into and through the stages of the shift registers in synchronism with timing signals spaced apart by the said datum time spacing, and the switching means comprises means for selecting each pair of bits from either the first or the second stages of the shift registers according to whether the said transition corresponding to that pair of bits occurs before or after the corresponding timing signal.

20. A system according to claim 18, including selection means for selecting one or other of the two possible time spacings so as to ensure that either or both of the following criteria are satisfied: (a) that the mean long term spacing of the transitions is constant and equal to a predetermined value, and (b) that the mean long term DC content of the output waveform constituted by the transitions is substantially zero.

21. A system according to claim 20, in which the selection means comprises means operative when the next pair of bits to be encoded has two possible corresponding time spacings to compare those time spacings with signals representing the cumulative effect of the transitions on the mean long term time spacing and on the mean long term DC content, so as to select that one of the two possible time spacings which constrains those mean values within predetermined limits.

22. A system according to claim 21, including decoding means for decoding each transition to determine the values of the corresponding pair of bits comprising means for producing clock signals, means responsive to the mean time spacing of the transitions to adjust the frequency and phase of the clock pulses to predetermined values, and means for counting the number of such clock pulses occurring between consecutive transitions.

23. A system according to claim 22, including decoder receiving means for receiving and temporarily storing each of a plurality of bits corresponding to the numbers of the said clock pulses occurring between consecutive transitions, and thus representing the values of the corresponding pairs of decoded bits, and switching means operative at regularly spaced time intervals for consecutively selecting from the decoder receiving means the temporarily stored numbers corresponding to the bits of each succeeding pair of bits.

24. A system according to claim 23, in which the decoder receiving means comprises two multi-stage shift registers one connected to receive, serially, the first bits of each pair of decoded bits and the other connected to receive, serially and in synchronism with the first bits, the respective second bits of each pair of decoded bits, and means for clocking the bits into and through the stages of the shift registers in synchronism with the data transitions; and the switching means comprises a counter which is connected to be counted in one direction by timing signals mutually separated by the said datum time spacing and to be counted in the opposite direction by signals synchronised with the said transitions, and means responsive to a value of the resultant count to select the pair of bits from the corresponding stages in the shift registers.

25. A system according to claim 22, including decoding means for decoding each transition to determine the values of the corresponding pair of bits comprising means for producing clock signals, means responsive to the mean time spacing of the transitions to adjust the frequency and phase of the clock pulses to predetermined values, and means for counting the number of such clock pulses occurring between consecutive transitions.

26. A system according to claim 25, including decoder receiving means for receiving and temporarily storing each of a plurality of bits corresponding to the numbers of the said clock pulses occurring between consecutive transitions, and thus representing the values of the corresponding pairs of decoded bits, and switching means operative at regularly spaced time intervals for consecutively selecting from the decoder receiving means the temporarily stored numbers corresponding to the bits of each succeeding pair of bits.

27. A system according to claim 26, in which the decoder receiving means comprises two multi-stage shift registers one connected to receive, serially, the first bits of each pair of decoded bits and the other connected to receive, serially and in synchronism with the first bits, the respective second bits of each pair of decoded bits, and means for clocking the bits into and through the stages of the shift registers in synchronism with the data transitions; and the switching means comprises a counter which is connected to be counted in one direction by timing signals mutually separated by the said datum time spacing and to be counted in the opposite direction by signals synchronised with the said transitions, and means responsive to a value of the resultant count to select the pair of bits from the corresponding stages in the shift registers.

* * * * *

However, if the data to be encoded is binary 1, which will arrive on line 422, the initial count of the counter will be binary 11. Therefore, the signal on line 436 will be produced after one clock pulse (T) if the counter is counting up and after three clock pulses (3T) if the counter is counting down.

As with the encoder of FIG. 5, the decision whether counter 420 is to count up or down is made by an electronic representation of a composite map formed by superimposing the maps of FIG. 14, and FIG. 16 shows such a composite map. The composite map is represented by the counter 450 and 452. In this case, each such counter is a 2-bit counter which counts up to decimal 2 and then repeats. FIG. 16 shows the two counters represented along the sides of the composite map so that, as before, the states of the two counters define where the point is positioned on the map at any time.

Figure 15:
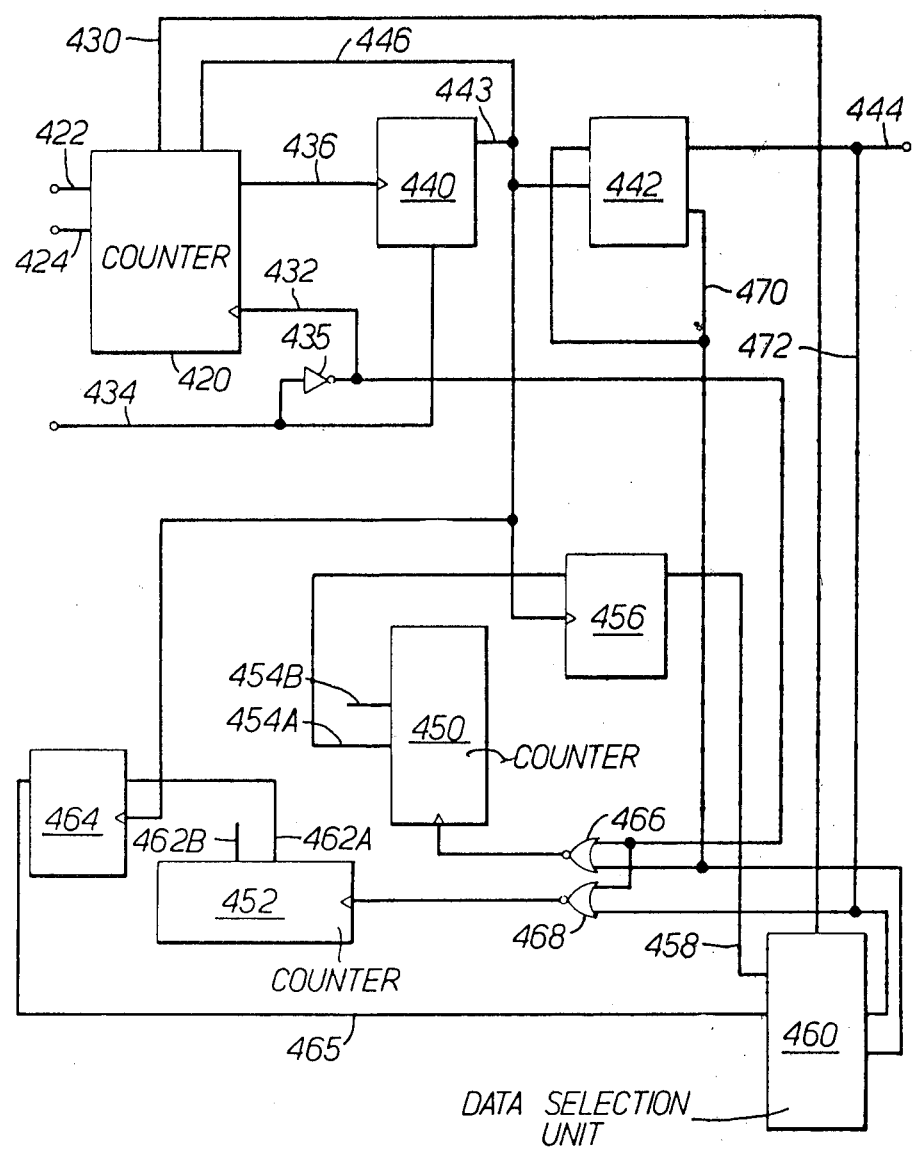
FIG. 15 is a block circuit diagram corresponding to FIG. 5 but showing an encoder in the modified system.

In the encoder of FIG. 5, the sub-area R, S, T or U on the composite map in which the system is currently operating was defined by the most significant digits of counters 50 and 52. In the encoder of FIG. 15, on the other hand, the sub-area is defined by the least significant digits of the counters, and therefore latches 456 and 464 are connected to receive this information from the counters 450 and 452 by lines 454A and 462A respectively.

It is not believed that a full explanation of the operation of the counters 450 and 452 is necessary. Table C below corresponds to Table A and indicates, for points in each of the sub-areas R, S, T and U (shown in FIG. 16), whether the next transition on the encoded data waveform is to occur early or late (assumimg the bit to be encoded is "1"), taking into account whether the previous transition has taken the encoded data signal (the waveform produced by the encoder) to binary HIGH or binary LOW.

TABLE C

| Level of Output Signal | Sub Area | Least Significant digits of counters 450 and 452 | Counter to be counted | Late or early transition required | Count direction required for counter 420 |
|---|---|---|---|---|---|
| High | R | 1, 0 | 450 | early | up |
| Low |   |      | 452 | late  | down |
| High | S | 1, 1 | 450 | early | up |
| Low |   |      | 452 | late  | up |
| High | T | 0, 1 | 450 | late  | down |
| Low |   |      | 452 | early | up |
| High | U | 0, 0 | 450 | late  | down |
| Low |   |      | 452 | late  | down |

As shown, Table C indicates whether counter 420 is to count up or down. Therefore, the data selection unit 460 in the encoder of FIG. 15 functions in similar fashion to the data selection unit 60 in the encoder of FIG. 5. Thus, the data selection unit 460 receives information on lines 470 and 472 indicating the binary level of the data output signal. It also receives information on lines 458 and 466 indicating in which sub-area of the map the system is currently operating. Therefore, the data selection unit 460 determines, in accordance with pre-stored information corresponding to that in Table C, when the counter 420 is to count up and when it is to count down and energises line 430 appropriately. In addition, it controls gates 466 and 468 to ensure that the appropriate one, only, of the counters 450 and 452 is counted to record the new position on the map.

As with the first system described, the system now being described will require a data input arrangement for ensuring that the data bits are presented to the encoder of FIG. 15 at the correct time if the bits are arriving at regular intervals. Because the system being described encodes binary "1" at either one of two time positions, it is not possible to control the input of the data bits to line 422 simply by reference to regularly occurring clock pulses. Such a data input arrangement can correspond generally to the input arrangement shown in FIG. 8. There would of course only be one shift register (e.g. register 204) and its corresponding selector switch (210) instead of two such items. The adder (214) would be only a 2-bit adder because of the smaller capacity of the counters 450 and 452.

The decoder is shown in FIG. 17 and is basically the same as the decoder of FIG. 9. The reference numeral in FIG. 17 for each item is the same as the reference numeral for the corresponding item in FIG. 9 except that it is preceded by "4".

Counter 4108 is a 2-bit counter which is pre-loaded with a count of decimal 2 (binary 10). The count detecting unit 4122 is arranged to detect when counter 108 reaches a count of decimal 1 and produces the output on line 4214 to indicate this.

The operation of the decoder can be explained with reference to FIG. 10. Although the waveforms of FIG. 10 have been used to explain the operation of the decoder of FIG. 9, they can also be used to explain the operation of the decoder of FIG. 17. Thus, waveform 10A shows an encoded data waveform which, in this example, is assumed to be a succession of "0's", that is, it is a regular waveform whose transitions are separated by 2T, two clock periods. Waveform 10B shows the pulses produced in response to this waveform and applied to line 4112 in FIG. 17.

In response to pulse P1, latches 4106, 4116 and 4126 are reset and the count of decimal 2 is loaded into counter 418 by means of its preset inputs. The counter now begins to count down in response to the clock pulses on line 4110.

Figure 13:
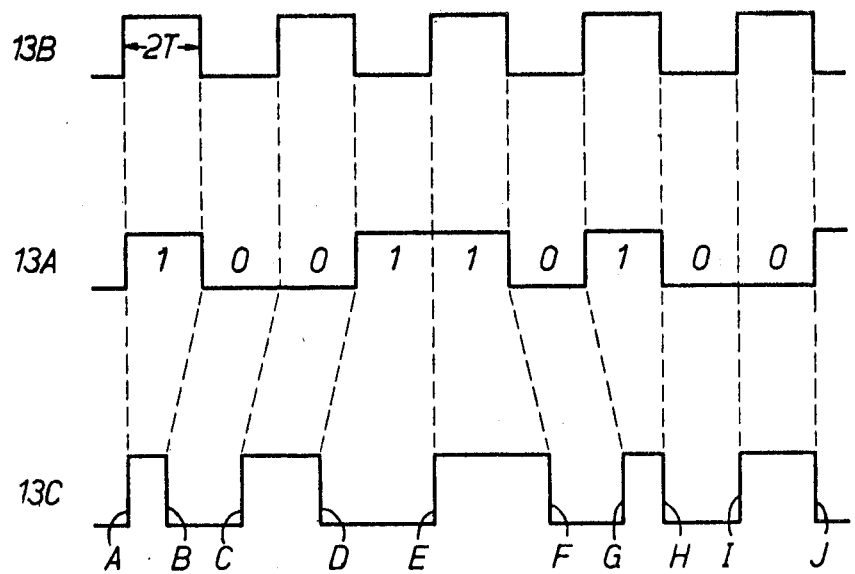
FIG. 13 is a waveform diagram corresponding to FIG. 1 but for a modified form of the system.

It will initially be assumed that these clock pulses have the correct frequency and phase, that is they have the same frequency as, and are in phase with, the clock pulses producing the clock periods shown in FIG. 13B.

Waveform 10C shows the state of the latch 4126 and represents the output current which it feeds to integrator 4127. Initially the latch is reset by pulse P1. At time $t_a$, however, counter 4108 reaches decimal 1, and detecting unit 4122 sets latch 4126. When pulse P2 occurs, this will be exactly coincident with the second clock period, and latch 4126 will be reset. Therefore, the positive and negative half cycles of the output current produced by latch 4126 will be equal, and the means output of integrator 4127 will be unchanged.

If the output frequency of oscillator 4100 is too high, detector 4122 will detect that counter 4108 has reached the count of decimal 1 at time $t_b$ (waveform 10C) that is, earlier than half way through the cycle, and will at this time set the latch 4126. The latch will not be reset until pulse P3 occurs. Therefore, integrator 4127 receives unequal positive and negative inputs and (because of its inverting nature) produces a negative output on line 4102 which reduces the frequency of oscillator 4100. The reverse operation occurs if the output frequency of oscillator 4100 is too slow.

As with the decoder of FIG. 9, therefore, the frequency of oscillator 4100 is automatically controlled to be equal to the clock frequency in the encoder. Switch 4136 resets oscillator 4100 to ensure that the oscillator also has the correct phase.

Data is encoded by means of line 4120 which feeds the least significant digit output of counter 4108 to latch 4130.

If the time position of a pulse on line 4112 with respect to the immediately preceding pulse represents binary 0, the two pulses on line 4112 will be separated by two clock periods and therefore counter 4108 will have been counted down from the initial value of binary 10 to binary 00 during these two clock periods. When the second pulse occurs on line 4112, therefore, latch 4130 will output binary 0 on line 4134.

If the time position of a pulse on line 4112 with respect to the immediately preceding pulse represents binary 1 and has been encoded by means of a transition occurring one clock period (T) (instead of 3T) after the preceding one, then when relevant pulse occurs on line 4112, counter 4108 will have been counted down from its initial count of binary 10 to binary 01 and latch 4130 will therefore read the "1" from line 4120 and present it on line 4134. If, instead, however, the encoded binary 1 had been encoded by means of a transition occurring late, that is, 3T after the previous transition, then the relevant pulse on line 4112 would occur after counter 4108 had counted three clock periods from the initial count of binary 10. The first two of these would count the count down to binary 00 and the loop provided by latch 4116 would immediately switch the counter to start counting up instead of down. The third clock period would therefore cause the counter to count back to binary 01, and again the correct data output of binary 1 would be produced on line 4134.

As with the decoder of FIG. 9, the decoder of FIG. 17 outputs the data on line 4134 at irregular intervals. If, therefore, it is desired to convert this irregular data stream into a regular data stream, a data output arrangement of similar form to that described with reference to FIGS. 11 and 12 may be used. Because the data bits are not being encoded in pairs, the output arrangement requires only a single shift register, corresponding to shift register 302 of FIG. 11. The timing signals on line 316 (FIG. 11) will now be signals spaced apart by two clock periods. Shift register 302 need have only three stages because it is not possible for more than one data transition to occur between successive timing signals on line 316, or for more than one data transition to occur between successive timing signals on line 316, or for more than one such timing signal to occur between successive data transitions.

Figure 12:
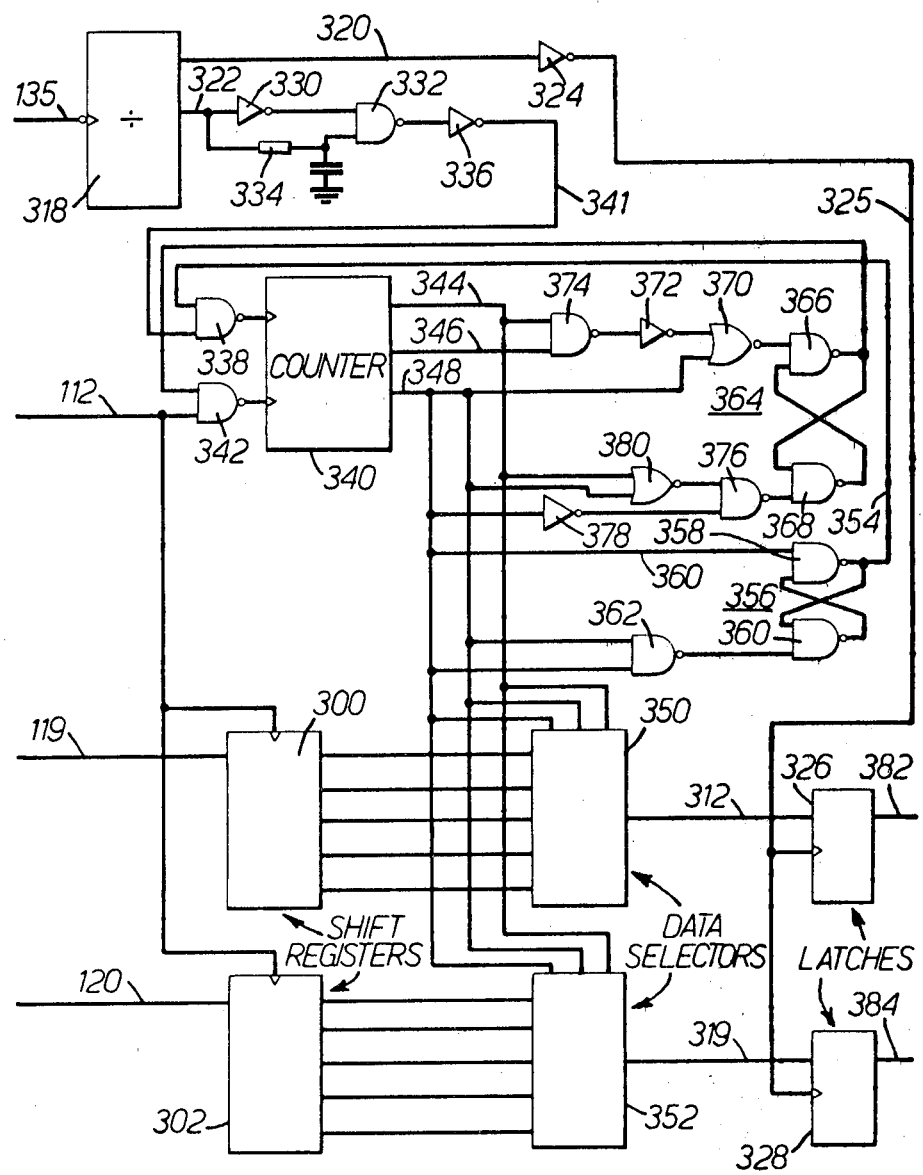
FIG. 12 is a more detailed block circuit diagram of the data output arrangement of FIG. 11.

The circuit for controlling the shift register would be similar to that shown in FIG. 12, except that divider 318 would be arranged to produce an output on line 320 which occurs at one half of the oscillator frequency on line 135 and one output on line 322 which occurs at one quarter of the oscillator frequency. The gates 338 and 342 would be controlled to constrain the counter 340 to operate between a count of decimal 1 and decimal 3 inclusive, and therefore the latch circuits 356 and 364 would be appropriately modified as is apparent to those skilled in the art.

The encoding/decoding system just described has a minimum time between transitions of half the bit length and this makes the arrangement less suitable for recording data on magnetic tape at high densities. However, the relatively large minimum time between transitions does have certain advantages, particularly for use in recording data at slow magnetic tape speeds. A relatively large minimum time between transitions enables the system to cope well with the slow tape speed and possible poor speed stability or jitter.

What is claimed is:

1. A system for encoding the value of units of data, comprising
    means connected to receive each data unit and producing an electrical signal in response thereto, each electrical signal being of opposite polarity to the preceding one and being defined by oppositely directed signal transitions,
    means connected to receive and sense the value of each data unit in turn and operative to control the time spacing between the transition to a respective electrical signal and the immediately preceding transition in dependence on the value of the data unit, one of the possible values of the data unit corresponding to a predetermined datum time spacing and the or each other possible value of the data unit having a respective pair of possible time spacings, one greater than, and one less than, the length of the datum time spacing, and
    selecting means connected to receive and sense the values of the data units and operative in response to a data unit having the or each said other possible value to compare the two possible corresponding time spacings with signals representing the cumulative effect of the transitions on the mean long term time spacing and on the mean long term DC content of the output waveform produced by the electrical signals, so as to select that one of the two possible time spacings which constrains those mean values within predetermined limits.

2. A system according to claim 1, in which each data unit consists of a single bit having the value of either binary 0 or binary 1.

3. A system according to claim 1, in which each data unit comprises two bits having a possible value of binary 11, binary 10, binary 01 or binary 00.

4. A system according to claim 1, in which the means for controlling the time spacing comprises
    means producing a plurality of waveforms having predetermined phase differences between them, and
    means for controlling the time spacing by selecting a predetermined one of the waveforms as the electrical signal.

5. A system according to claim 4, in which the waveforms are sinusoidal waveforms.

6. A system according to claim 1, including
    encoder receiving means connected to recieve at regularly spaced time instants, successive data units to be encoded and for temporarily storing them,
    switching means operative, when actuated, to select from the receiving means each data unit to be encoded, and
    means responsive to the times of occurrence of the said transitions for actuating the switching means at the time instants which are irregularly spaced in dependence on the values of the successive data units.

7. A system according to claim 1, including decoding means responsive to the time spacing between successive said transitions to determine the values of the corresponding data units.

8. A system according to claim 7, in which the decoding means comprises
    means for producing clock pulses,

UNITED STATES PATENT AND TRADEMARK OFFICE
CERTIFICATE OF CORRECTION

PATENT NO. : 4,373,154
DATED : February 8, 1983
INVENTOR(S) : Baime et al.

It is certified that error appears in the above—identified patent and that said Letters Patent is hereby corrected as shown below:

Column 5, line 23, "divive" should be --divide--;

Column 21, line 22, "least" should be --last--;

Column 24, line 51, "recieve" should be --receive--.

Signed and Sealed this

Seventeenth Day of May 1983

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,373,154
DATED : February 8, 1983
INVENTOR(S) : Balme et al.

It is certified that error appears in the above—identified patent and that said Letters Patent is hereby corrected as shown below:

Column 5, line 23, "divive" should be --divide--;

Column 21, line 22, "least" should be --last--;

Column 24, line 51, "recieve" should be --receive--.

Signed and Sealed this

Seventeenth Day of May 1983

[SEAL]

Attest:

DONALD J. QUIGG

Attesting Officer

Acting Commissioner of Patents and Trademarks